(12) United States Patent
Katar et al.

(10) Patent No.: US 9,749,252 B2
(45) Date of Patent: Aug. 29, 2017

(54) SHORT PACKET COMMUNICATION IN A POWERLINE COMMUNICATION NETWORK

(71) Applicant: QUALCOMM Incorporated, San Diego, CA (US)

(72) Inventors: Srinivas Katar, Fremont, CA (US); Arun Avudainayagam, Fremont, CA (US); James Gerard Zyren, Melbourne Beach, FL (US)

(73) Assignee: QUALCOMM Incorporated, San Diego, CA (US)

( * ) Notice: Subject to any disclaimer, the term of this patent is extended or adjusted under 35 U.S.C. 154(b) by 71 days.

(21) Appl. No.: 14/502,662

(22) Filed: Sep. 30, 2014

(65) Prior Publication Data

US 2015/0092545 A1   Apr. 2, 2015

Related U.S. Application Data

(60) Provisional application No. 61/884,714, filed on Sep. 30, 2013.

(51) Int. Cl.
| | |
|---|---|
| *H04L 12/26* | (2006.01) |
| *H04L 12/805* | (2013.01) |
| *H04B 3/54* | (2006.01) |
| *H04L 1/00* | (2006.01) |

(52) U.S. Cl.
CPC ........... *H04L 47/365* (2013.01); *H04B 3/542* (2013.01); *H04B 3/546* (2013.01); *H04L 1/0078* (2013.01); *H04B 2203/5408* (2013.01)

(58) Field of Classification Search
None
See application file for complete search history.

(56) References Cited

U.S. PATENT DOCUMENTS

| | | | | |
|---|---|---|---|---|
| 6,690,719 | B1 | 2/2004 | Raphaeli et al. | |
| 7,352,770 | B1 * | 4/2008 | Yonge, III | H04B 3/54 370/445 |
| 2001/0050923 | A1 * | 12/2001 | Park | H04L 29/06 370/474 |
| 2003/0103521 | A1 * | 6/2003 | Raphaeli | H04B 3/542 370/445 |
| 2003/0117984 | A1 * | 6/2003 | Gavette | H04L 12/40156 370/338 |

(Continued)

OTHER PUBLICATIONS

"PCT Application No. PCT/US2014/058408 International Search Report", Dec. 23, 2014, 10 pages.

(Continued)

*Primary Examiner* — Nicholas Sloms
(74) *Attorney, Agent, or Firm* — DeLizio Law, PLLC

(57) ABSTRACT

A network device may transmit a short packet when the length of application data that will be transmitted does not exceed a threshold length. In some embodiments, the network device may transmit the application data in a frame control field of the short packet. The short packet may not include a payload field. In other embodiments, the network device may support multiple short payload field lengths and may transmit the application data in a short payload field with an appropriate short payload field length. The network device may also support communication techniques to transmit the application data in the short packet.

44 Claims, 11 Drawing Sheets

(56) References Cited

U.S. PATENT DOCUMENTS

| | | | |
|---|---|---|---|
| 2009/0323671 A1* | 12/2009 | Wu | H04W 28/065 |
| | | | 370/352 |
| 2011/0224841 A1* | 9/2011 | Profitt-Brown | B60K 35/00 |
| | | | 701/2 |
| 2013/0044630 A1 | 2/2013 | Seelman et al. | |
| 2013/0051264 A1* | 2/2013 | Wang | H04L 5/0098 |
| | | | 370/252 |
| 2013/0177313 A1* | 7/2013 | Hirth | H04Q 11/0067 |
| | | | 398/66 |
| 2015/0071364 A1* | 3/2015 | Batra | H04B 3/542 |
| | | | 375/257 |

OTHER PUBLICATIONS

"PCT Application No. PCT/US2014/058408 International Preliminary Report on Patentability", Oct. 1, 2015, 7 pages.

* cited by examiner

SHORT PACKET COMMUNICATION IN A POWERLINE COMMUNICATION NETWORK

RELATED MATTER

This application claims priority benefit of U.S. Provisional Patent Application Ser. No. 61/884,714 filed on Sep. 30, 2013.

BACKGROUND

Embodiments of the disclosure generally relate to the field of communication networks and, more particularly, to short packet communication in a powerline communication (PLC) network.

Electric power is transmitted over transmission lines at a high voltage, and is distributed to buildings and other structures at much lower voltages using electric power lines. Besides providing electric power, the electric power lines can also be used to implement powerline communications within buildings and other structures. Powerline communications can provide another communication medium for connecting various network nodes together in local and wide area networks. Powerline communications can allow electronic devices to connect to each other and to the Internet using existing alternating current (AC), direct current (DC), and unpowered wiring for communication. For example, HomePlug® devices can be used for wired communication using IEEE 1901 and HomePlug AV/AV2/GreenPHY standards for broadband over powerline communication.

Various types of vehicles, such as automobiles, typically include a collection of electric cables and/or wires that provide communication signals or electrical power between components of the vehicle. The collection of electrical cables and/or wires in the vehicle may also include wires to implement low-rate data buses, such as a local interconnect network (LIN) bus and a controller area network (CAN) bus for intra-vehicular communications. However, it is typically not desirable to use LIN and CAN buses in intra-vehicular communication networks because of the additional wires and complex wiring harnesses that are introduced into the vehicles to implement data communications. Configuring vehicular communication systems to implement PLC protocols may reduce the complexity and cost of the intra-vehicular communication networks because PLC networks typically use the power lines of the system both for providing power and for data communications. PLC networks usually do not need additional wires and/or complex wiring harnesses for data communications. However, it is typically not desirable to implement PLC protocols within the vehicles because the vehicular communication systems have specifications that are usually not supported by PLC protocols. For example, PLC protocols typically specify a frame format for PLC packets that includes a predefined length for the payload field. PLC protocols typically do not support transmitting PLC packets having a payload field that is less than the predefine length.

SUMMARY

Various embodiments for transmitting short packets in a communication network are disclosed. In one embodiment, a first network device determines to transmit application data to a second network device of a communication network. The first network device determines whether a length of the application data exceeds a threshold length. The first network device transmits the application data to the second network device in a frame control field of a short packet when the length of the application data does not exceed the threshold length.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
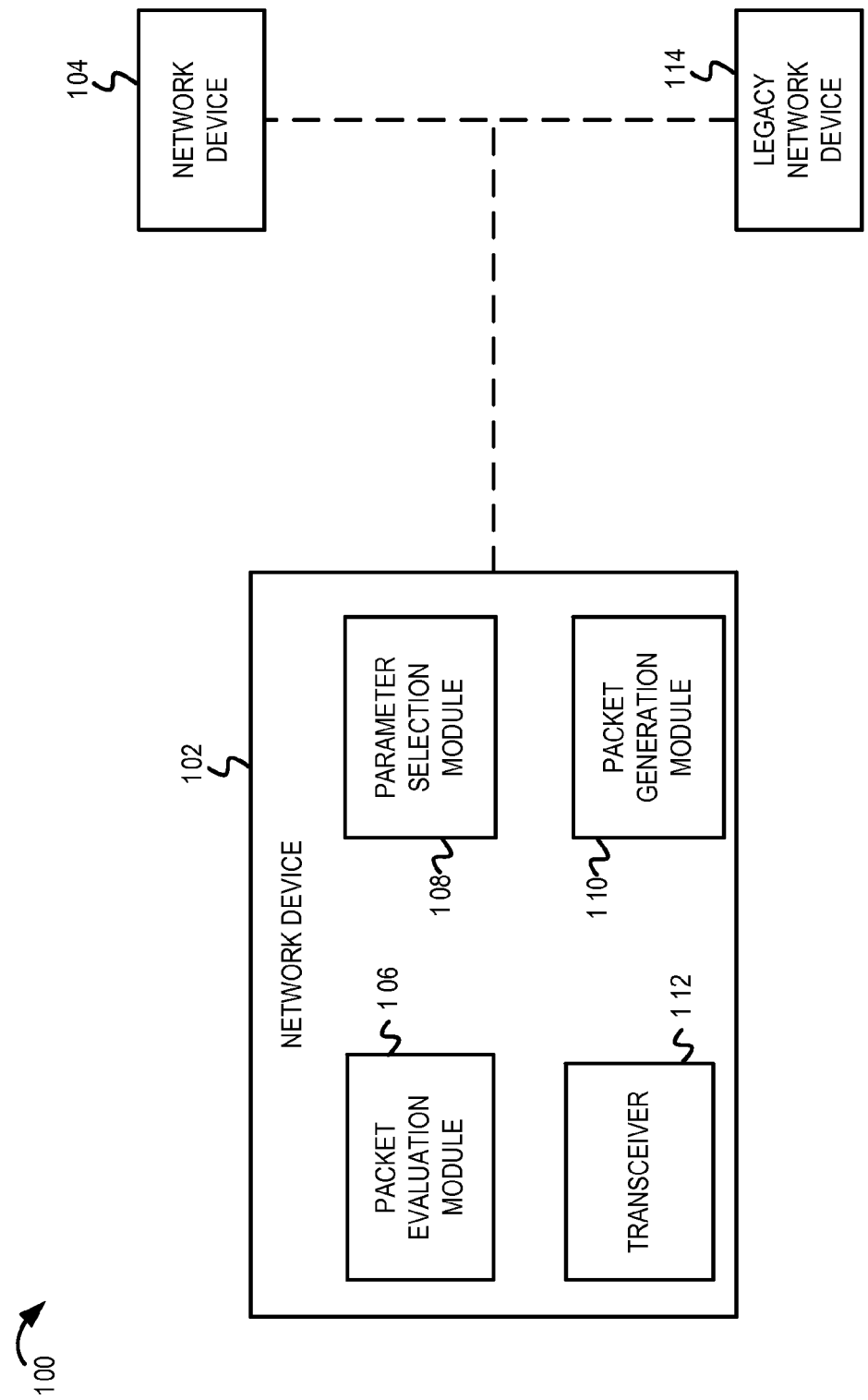
FIG. 1 is an example block diagram including a mechanism for transmitting a short packet in a communication network.

The description that follows includes exemplary systems, methods, techniques, instruction sequences, and computer program products that describe various embodiments of the present disclosure. However, it is understood that the described embodiments may be practiced without specific details disclosed. For example, embodiments describe transmitting packets in a powerline communication network using HomePlug AV/AV2/GreenPHY or IEEE 1901 communication protocols. However, in other embodiments, the operations described herein can be extended to other wired communication protocols (e.g., multimedia over coax alliance (MoCA) protocols, Ethernet protocols, etc.) or wireless communication protocols (e.g., wireless local area network (WLAN) protocols such as IEEE 802.11 protocols). Well-known instruction instances, protocols, structures, and techniques may not be shown in detail in order not to obfuscate the description.

A powerline network is a shared communication network in which multiple network devices are coupled to the powerline medium. In addition to providing electric power, the powerline network may also facilitate communications between powerline communication (PLC) devices. For example, high-speed communications between a vehicle and a charging station may allow the charging station to provide electric power to the vehicle with little to no user interaction. The vehicle and the charging station typically use a low-rate data bus to exchange billing information, health and status information, command/control information, and other communications. The vehicle and/or the charging station may also use a low-rate data bus for internal communications. The length of the packets exchanged between the vehicle and the charging station, within the vehicle, and/or within the charging station are typically very short (e.g., eight bytes). In some embodiments, the vehicle and the charging station may use PLC protocols (e.g., HomePlug AV/AV2/GreenPHY protocols, IEEE 1901 protocols) for inter-device communications and intra-device communications. Using PLC protocols for communication can minimize the complexity of wiring harnesses and eliminate the need for additional data buses (e.g., local interconnect network (LIN) bus) in the vehicle and/or the charging station. However, the frame format of a PLC packet typically includes a preamble field, a frame control field, and a payload field. The length of the payload field is typically predefined based on the communication protocols that are being implemented. Therefore, when the length of application data that will be transmitted between PLC devices is less than the predefined length of the payload field of a PLC packet, the PLC device embeds additional "0" bits or "pads" the application data, so that the resultant length of the application data equals the predefined length of the payload field. For example, if a PLC protocol uses a predefined payload field length of 136-bytes, a 76-byte padding may be added to transmit 60-byte application data within the predefined 136-byte payload field. However, padding a shorter payload with additional bytes for transmission in a longer predefined payload field length can decrease transmission efficiency. In some embodiments, the payload field of the PLC packet may include an Ethernet packet. The Ethernet packet may include an Ethernet header and an Ethernet payload (with the application data). Transmitting the Ethernet packet within the PLC packet may be redundant, increase overhead, and reduce packet transmission efficiency.

In some embodiments, a network device can be configured to efficiently transmit a "short packet" when the length of application data that will be transmitted is less than a threshold length. For example, if a PLC protocol specifies the use of a predefined payload field length to transmit application data, the network device can be configured to transmit a short packet in a PLC network when the length of the application data that will be transmitted is less than the predefined payload field length specified by the PLC protocol. In some embodiments, the network device may transmit the application data in the frame control field without transmitting the payload field, as will be described with reference to FIGS. 1-4 and 6. In another embodiment, instead of transmitting the application data in the frame control field, the network device may transmit the application data in a short payload field with an appropriate length, as will be described with reference to FIGS. 5 and 6. The network device may support multiple lengths for the short payload field ("short payload field lengths") and may select the appropriate short payload field length based on the length of the application data. In some embodiments, the network device may also support multiple packet generation techniques and packet transmission techniques (collectively referred to as "communication techniques" or "short packet communication techniques") for transmitting application data in the short packet. For example, the network device may apply an encoding scheme, a modulation technique, a transmission mode, etc. for transmitting the application data in the short packet, as will be further described in FIGS. 7-10. Adapting existing communication protocols to transmit the application data within the frame control field without transmitting the payload field can minimize overhead, and improve communication efficiency. Furthermore, configuring a network device to support multiple lengths for the frame control field ("frame control field lengths"), multiple payload field lengths, and/or multiple communication techniques for generating and transmitting short packets can improve communication efficiency and minimize complexity, power consumption, and transmission time.

FIG. 1 is an example block diagram including a mechanism for transmitting a short packet in a communication network 100. The communication network 100 includes network devices 102 and 104. The network device 102 includes a packet evaluation module 106, a parameter selection module 108, a packet generation module 110, and a transceiver 112. Although not shown in FIG. 1 for simplicity, the network device 104 may also include a packet evaluation module, a parameter selection module, a packet generation module, and/or a transceiver. The network devices 102 and 104 may execute operations described herein for short packet communication, as will be further described below. The communication network 100 may also include a legacy network device 114. Legacy network devices are defined to be network devices that do not support the operations described in the present disclosure for short packet communication. The network devices 102, 104, and 114 may be communicatively coupled with each other using wired and/or wireless communication links, depicted in FIG. 1 using dashed lines.

In one embodiment, the communication network 100 may be a PLC network and the network devices 102, 104, and 114 may each be PLC-capable devices. In some embodiments, the network devices 102, 104, and 114 may operate using a HomePlug 1.0/AV/AV2/GreenPHY communication protocol, an IEEE 1905 communication protocol, or another suitable PLC protocol. In some embodiments, in addition to (or instead of) the PLC protocol, the network devices 102, 104, and 114 may also implement other suitable wired communication protocols (e.g., Ethernet protocols, MoCA protocols, etc.) and/or wireless communication protocols (e.g., WLAN protocols, such as IEEE 802.11 protocols). In some embodiments, the network devices 102, 104, and 114 may be electronic devices, such as a desktop computer, a laptop computer, a tablet computer, a mobile phone, a smart appliance, a navigation device, a media player, a gaming console, a network bridging device, an access point, or another electronic device that implement wired and/or wireless communication protocols. In some embodiments, one or more of the network devices 102, 104, and 114 may be a standalone or dedicated PLC device that directly connects to an AC outlet of a powerline network (not shown). In some embodiments, the network devices 102, 104, and 114 may be electronic devices that are part of a communication network of a vehicle or a charging station, as will be further described in FIG. 2.

In some embodiments, the network device 102 may determine to transmit application data to the network device 104. The packet evaluation module 106 may determine whether the application data should be transmitted in a short packet. In some implementations, the packet evaluation module 106 may compare the length of the application data with a threshold length. If the length of the application data is less than the threshold length, the packet evaluation module 106 may determine that the application data should be transmitted in a short packet. For example, the packet evaluation module 106 may compare the number of bytes of application data with a threshold. The threshold may be determined based, at least in part, on the number of bytes that can be transmitted in the payload field of a conventional PLC packet. If the number of bytes of application data is less than the threshold, the packet evaluation module 106 may determine that the application data should be transmitted in a short packet. In one example, a vehicle may use a low-rate data bus to transmit a short payload (e.g., between one and eight bytes) for internal communications, such as to control a vehicle entertainment system, open/close doors, adjust vehicle mirrors, and so on. In another example, in a vehicle charging environment, the vehicle and a charging station may exchange short packets for inter-vehicular communications, such as for indicating health/status information, command/control information, billing information, etc. In another example, the charging station may use a low-rate data bus to transmit a short payload for internal communications.

In some embodiments, in addition to determining whether to transmit the application data in the short packet, the packet evaluation module 106 may also determine whether to transmit the application data in the frame control field or a short payload field, as will be described with reference to FIG. 6. If the packet evaluation module 106 determines to transmit the application data in the frame control field, the parameter selection module 108 may select an appropriate frame control field length for transmitting the application data, as will be described with reference to FIGS. 3, 4, and 6. If the packet evaluation module 106 determines to transmit the application data in the short payload field, the parameter selection module 108 may select an appropriate short payload field length for transmitting the application data, as will be described with reference to FIGS. 5 and 6.

Additionally, the parameter selection module 108 may select communication techniques for generating the short packet and for transmitting the short packet from the network device 102 to the network device 104. The short packet communication techniques may include an encoding technique, a transmission mode, a modulation technique, and/or other suitable communication techniques for generating and transmitting short packets, as will be further described below. The short packet communication techniques for generating and transmitting short packets may use data rate, communication carrier spacing, sampling frequency, fast Fourier transform (FFT) size, and/or other parameters and specifications to generate and transmit the short packets. The network devices 102 and 104 may support the communication techniques for generation, transmission, and reception of the short packets. The packet generation module 110 can generate the short packets using the communication techniques selected by the parameter selection module 108, as will be further described with reference to FIGS. 7-10. The transceiver 112 can transmit the short packets from the network device 102 to the network device 104.

The transceiver 112 may include a receiver and a transmitter. The receiver can include an analog front end, including an amplifier to amplify received signals, a filter to remove unwanted frequencies from the received signals, a mixer to down-convert the received signal, an automatic gain control (AGC) module, and/or an analog-to-digital converter (ADC). The receiver may also include a fast Fourier transform (FFT) module to convert the received signal from a time domain representation to a frequency domain representation. The receiver may also include a decryption and decoding module. The transmitter may include an analog front end including an amplifier to amplify signals to be transmitted, a filter to remove unwanted frequencies from the signals to be transmitted, a mixer to up-convert the signal to an appropriate transmission frequency, and/or a digital-to-analog converter (DAC). In some embodiments, the transmitter may also include an inverse fast Fourier transform (IFFT) module to convert the signal to be transmitted from a frequency domain representation to a time domain representation. In some embodiments, the transmitter may also include an encryption and encoding module.

Figure 2:
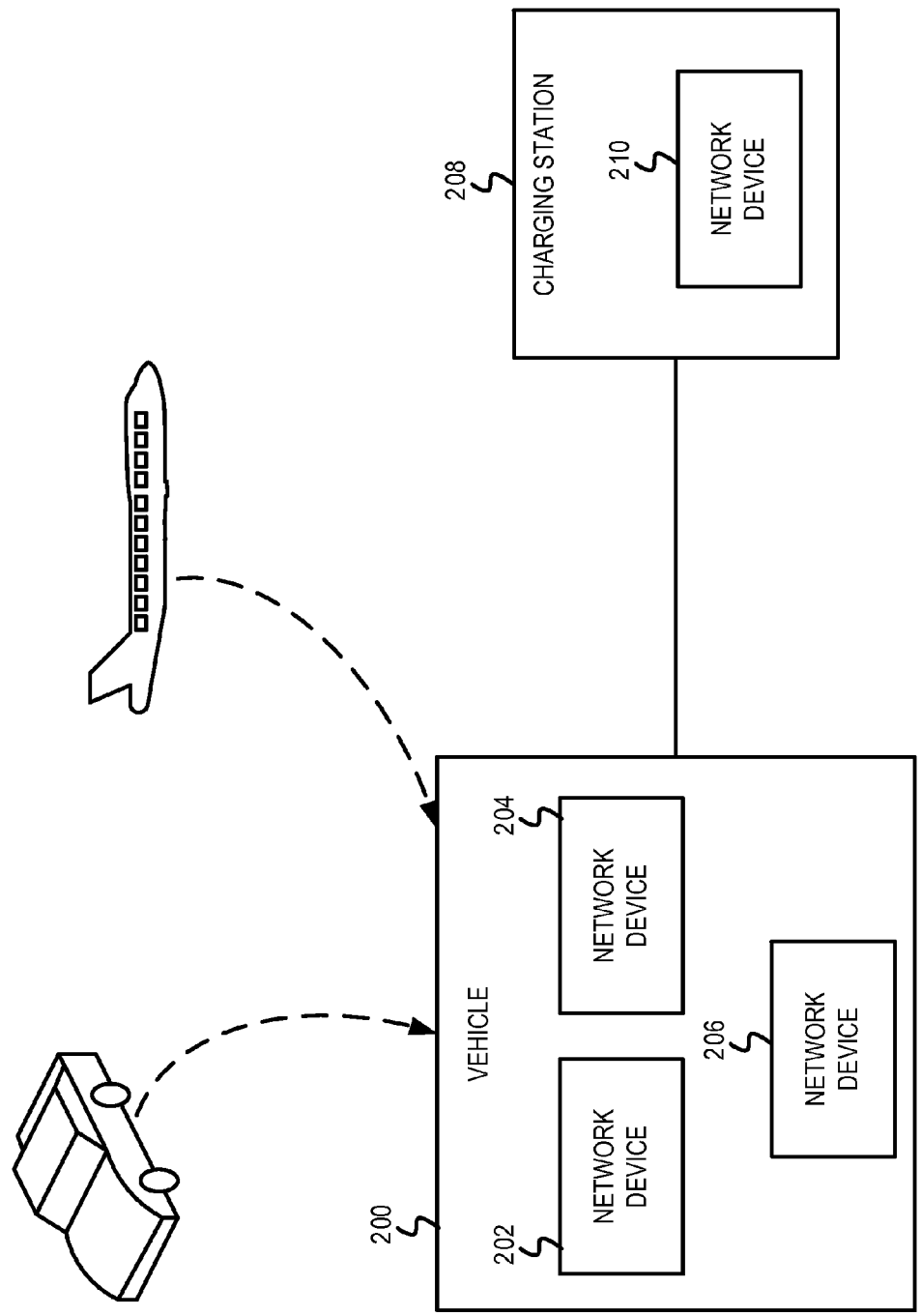
FIG. 2 is an example block diagram including a mechanism for transmitting a short packet between a vehicle and a charging station.

In some embodiments, the network devices 102, 104, and 114 may be part of a common electronic system, such as a vehicle, an aircraft, machinery, or other electronic system. FIG. 2 depicts a vehicle 200 coupled with a charging station 208. The vehicle 200 includes network devices 202, 204, and 206. The charging station 208 includes a network device 210. The vehicle 200 may be an electric vehicle, a plug-in electric vehicle (PEV), a hybrid electric vehicle, a gas-powered vehicle, an aircraft, etc. The network devices 202, 204, and 206 may be electronic device/components of the communication network of the vehicle 200 that implement operations for exchanging short packets for internal communications within the vehicle 200. For example, the network devices 202, 204, and 206 may be the vehicle's central computer, heating and cooling system components, charging and battery system components, entertainment devices, security system components (e.g., windows, door locks, alarm, etc.), and/or other suitable electronic devices/components of the vehicle 200. The network devices 202, 204, and 206 may exchange short packets to control various operations of the vehicle 200, such as adjusting vehicle mirrors, opening/closing vehicle doors, etc. In other embodiments, the network devices 202 and 210 may exchange short packets for communications between the vehicle 200 and the charging station 208. For example, the network devices 202 and 210 may exchange short packets for health and status information, billing information, etc. Although not depicted in FIG. 2, the network devices 202, 204, 206, and/or 210 may be configured similarly to the network device 102 of FIG. 1. For example, the network devices 202, 204, 206, and 210 may include a packet evaluation module, a parameter selection module, a packet generation module, and/or a transceiver.

FIG. 2 depicts the vehicle 200 including three network devices 202, 204, and 206. However, in other embodiments, the vehicle 200 may include any suitable number of network devices that exchange short packets. In some embodiments, the network devices 202, 204, and 206 within the vehicle 200 may form a first internal PLC network, such as an internal HomePlug AV network. Likewise, in some embodiments, the charging station 208 may include a suitable number of network devices that can exchange short packets. The network devices within the charging station 208 may form a second internal PLC network. The network devices of the vehicle 200 and the network devices of the charging station 208 may form a third PLC network when the vehicle 200 is connected to (or plugged into) the charging station 208.

A conventional/existing PLC packet (e.g., a HomePlug physical layer protocol data unit (PPDU)) typically includes a preamble field, a frame control field, and a payload field. In the existing PLC protocols, the frame control field may not be used to transmit application data and only the payload field may be used to transmit the application data. The predefined length of the payload field and the structure of the PLC packet may limit the efficiency of transmitting a short payload. As will be further described below, in some embodiments, the application data that can be transmitted in a PLC network may be referred to as a "short payload" if the length of the application data is less than a threshold length. For example, the application data may be referred to as a "short payload" if the number of bytes of the application data is less than a threshold. For example, if the application data that will be transmitted is less than 136 bytes, the application data may be deemed a short payload. In existing PLC protocols, the short payload is typically padded (e.g., by adding "0" bits) to yield a resultant payload that is equal to the longer predefined length of the payload field.

Figure 3:
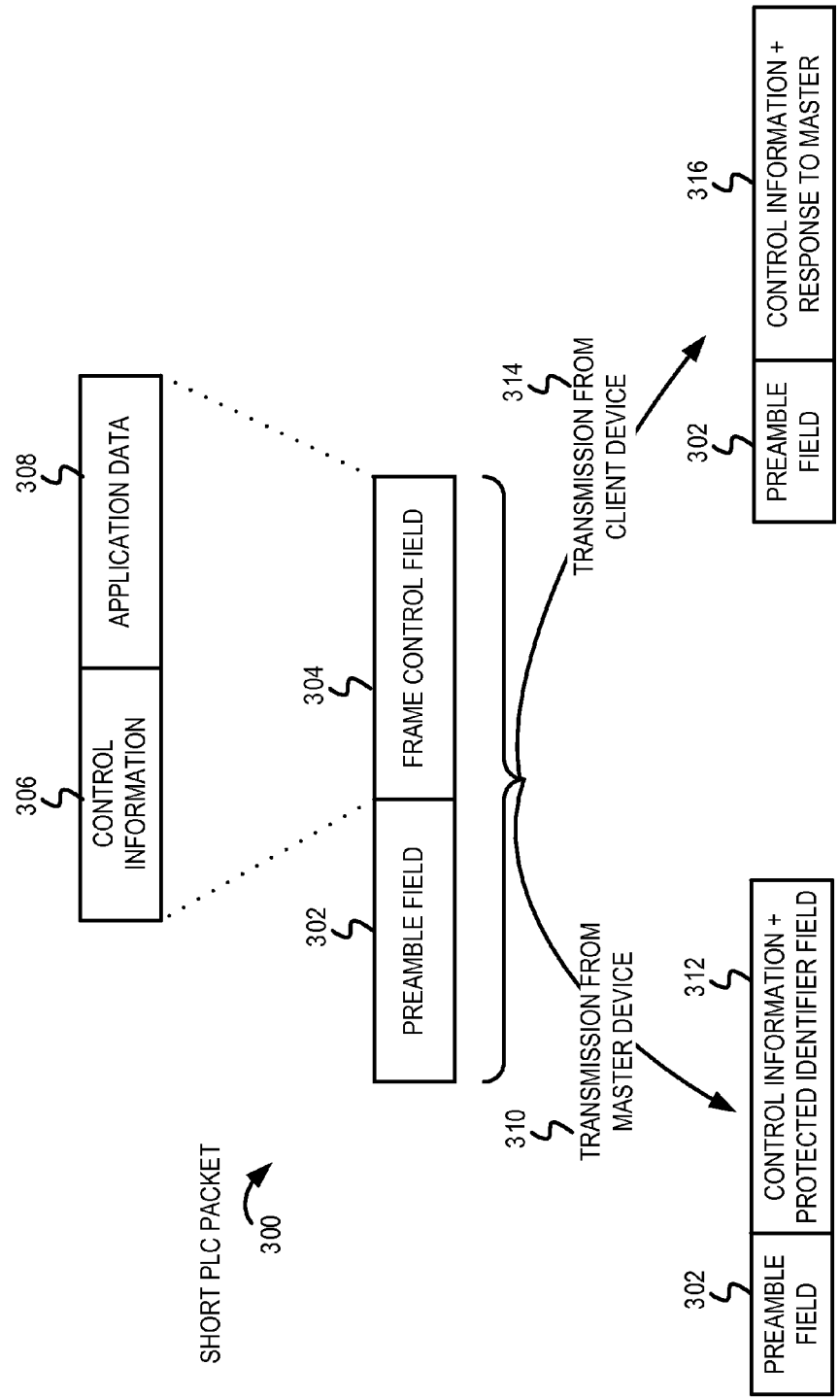
FIG. 3 is a an example format of a short packet.

FIG. 3 is an example format of a short packet that may be used to transmit small amounts of application data (e.g., 1-8 bytes). In some embodiments, as depicted in FIG. 3, short PLC packet 300 may only include a preamble field 302 and a frame control field 304 and may not include a payload field. The preamble 302 may include a predetermined repeating pattern to allow a receiving PLC device to detect the short PLC packet 300. The frame control field 304 may include control information 306 and application data 308. The control information 306 may include an identifier of a transmitting PLC device, an identifier of a receiving PLC device, the length of the short PLC packet 300, sequence identifiers, transmission priority, etc. The control information 306 may also include a physical layer (PHY) block size, tone map information, acknowledgment information, burst count, modulation type, etc. In some embodiments, in addition to the application data, the frame control field 304 may also include error detection information (e.g., a checksum, cyclic redundancy check (CRC) information, etc.). In one embodiment, the short PLC packet 300 may be a packet transmitted by a master PLC device or a client PLC device. In one implementation, the master PLC device may be an electric vehicle supply equipment (also referred to as EVSE or charging station). The client PLC device may be a vehicle (e.g., an electric vehicle, a plug-in electric vehicle, etc.). In some embodiments, the short PLC packet 300 may include a local interconnect network (LIN) or a control area network (CAN) bus packet that is transmitted between communication components of the vehicle via the PLC network. In this embodiment, the master PLC device may be the central computer within the vehicle; while the client PLC devices may be the heating and cooling system, charging and battery modules, entertainment devices, security system components, etc. within the vehicle.

Short PLC packet 310 represents the transmission from the master PLC device; while short PLC packet 314 represents the transmission from the client PLC device. In one example of this embodiment, the master PLC device may transmit the preamble field 302 and frame control field 312. The application data transmitted in the frame control field 312 may include protected identifier information from the master PLC device. In another example, the client PLC device may transmit the preamble field 302 and frame control field 316. The application data transmitted in the frame control field 316 may include a response that is generated by the client PLC device after receiving the protected identifier information from the master PLC device. The application data included in the transmissions 310 and 314 may be used for controlling a vehicle, for example, turning the lights on and off, checking the status of sensors, etc.

In some embodiments, as described with reference to FIG. 3, a portion of the frame control field 304 may be allocated for transmitting the control information 306 and the remaining portion of the frame control field 304 may be allocated for transmitting the application data 308. In some embodiments, the application data 308 may be transmitted in unused or reserved fields of the frame control field 304. In other embodiments, one or more fields of the frame control field 304 may be temporarily redefined to transmit the application data 308. The fields of the frame control field that are unused, reserved, or redefined may be referred to as "constituent fields" or "sub-fields." The constituent fields may include any suitable number of bits or bytes. Operations for transmitting the application data in the frame control field will be further described in FIG. 4.

Figure 4:
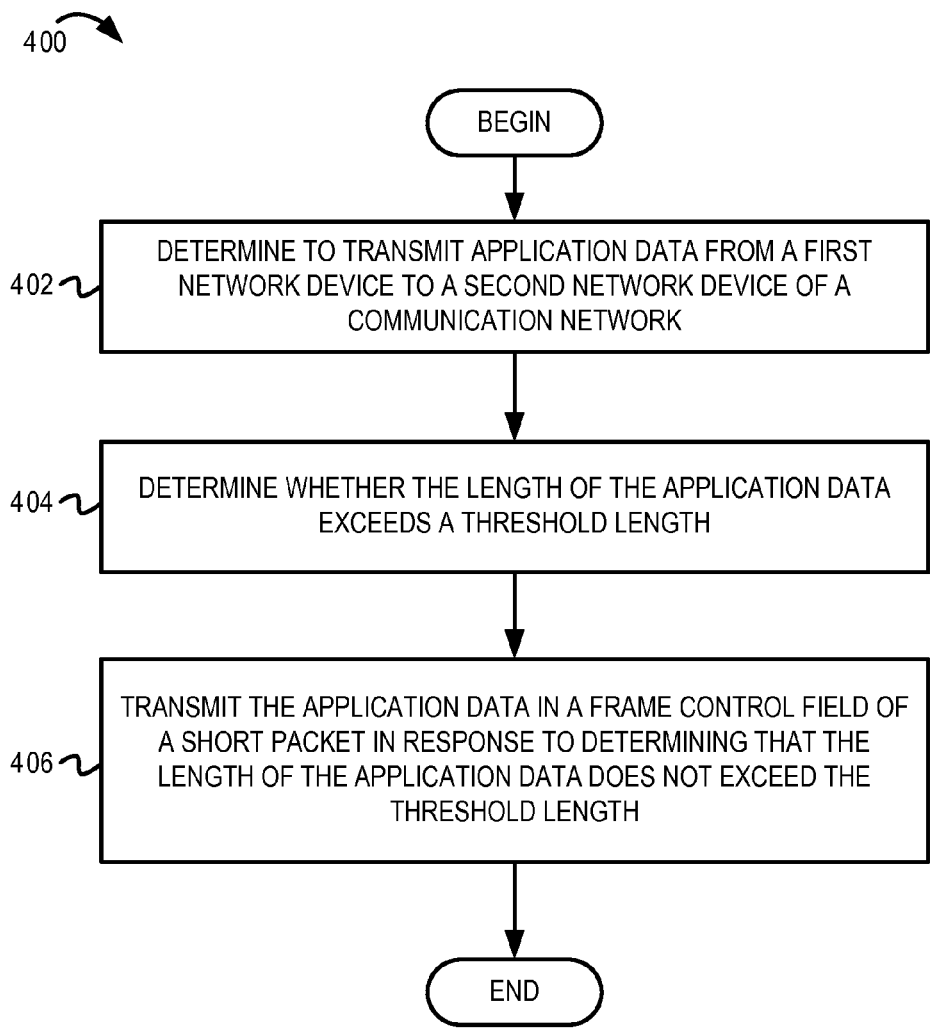
FIG. 4 is a flow diagram illustrating example operations for determining whether to transmit a short packet.

FIG. 4 is a flow diagram ("flow") 400 illustrating example operations for determining whether to transmit a short packet. The flow begins at block 402.

At block 402, a first network device determines to transmit application data to a second network device of a communication network. In one example, the first network device and the second network device may be an electric vehicle (EV) or an electric vehicle supply equipment (EVSE). As another example, the first network device and the second network device may be PLC modules within a vehicle (e.g., for intra-vehicular communications). As another example, the first network device and the second network device may each be a PLC device, a WLAN device, a MoCA device, or another network device that implements a suitable wired or wireless communication protocol. The flow continues at block 404.

At block 404, the first network device determines whether the length of application data exceeds a threshold length. For example, the packet evaluation module 106 may compare the length of the application data with the threshold length to determine whether to use a short packet format to transmit the application data to the second network device. In some embodiments, the threshold length may be equal to the maximum length of a frame control field. In another embodiment, the threshold length may be a predetermined percentage of the maximum length of the frame control field. In some embodiments, the first network device and the second network device may support multiple frame control field lengths. In this embodiment, the parameter selection module 108 may compare the length of application data with a plurality of threshold lengths. The parameter selection module 108 can select an appropriate frame control field length for transmitting the application data. The flow continues at block 406.

At block 406, in response to determining that the length of the application data does not exceed the threshold length, the first network device transmits the application data in a frame control field of the short packet. For example, the packet generation module 110 may generate the short packet including a preamble field and the frame control field, as described above with reference to FIG. 3. In one embodiment, the frame control field may include control information and the application data. In another embodiment, the frame control field may only include the application data and may not include the control information. The short packet may not include a payload field. In some embodiments, the short packet may also include an indication (e.g., a flag) that the frame control field includes the application data. In some embodiments, the first network device and the second network device may support a finer granularity of frame control field lengths (as compared to the 16-byte frame control field and/or a 32-byte frame control field in existing PLC protocols). Depending on the length of application data to be transmitted, the parameter selection module 108 may select an appropriate frame control field length for transmitting the application data in the short packet. For example, the network device 102 may support frame control fields with lengths of 8, 16, 32, and 64 bytes. In this example, if the length of the application data to be transmitted does not exceed 8 bytes, the parameter selection module 108 may determine that the application data should be transmitted in an 8-byte frame control field. As another example, if the length of the application data to be transmitting exceeds 16 bytes but is less than 32 bytes, the parameter selection module 108 may determine that the application data should be transmitted in a 32-byte frame control field.

In some embodiments, the number of bytes of the application data may be less than or equal to the number of unused/reserved bytes in the frame control field. In this embodiment, the packet generation module 110 may incorporate the application data in the unused/reserved bytes of the frame control field. In other embodiments, the number of bytes of the application data may exceed the number of unused bytes in the frame control field. In this embodiment, the packet generation module 110 may temporarily modify the interpretation of ("redefine") some of the known constituent fields of the frame control field. The application data may be transmitted in the redefined constituent fields of the frame control field. In another embodiment, the application data may be transmitted in a combination of the unused constituent fields and the redefined constituent fields of the frame control field.

In some implementations, the frame control field may include an indication that some constituent fields of the frame control field have been redefined to transmit the application data. In one example, the constituent fields that are redefined may be predetermined based on communication protocols. Thus, the first and the second network devices may have prior knowledge of the constituent fields that will be redefined to transmit the application data. In another implementation, the packet generation module 110 may redefine a different number and/or a different set of constituent fields depending on the length of the application data that will be transmitted. The packet generation module 110 may include an indication of the number and/or the set of constituent fields that were redefined to transmit the application data in the frame control field. For example, the packet generation module 110 may include a first indicator to specify that a first predetermined set of constituent fields includes the application data. The packet generation module 110 may include a second indicator to specify that a second predetermined set of constituent fields includes the application data. In other embodiments, the packet generation module 110 may use other suitable techniques to indicate which constituent fields of the frame control field will be used to transmit the application data.

In some embodiments, the packet generation module 110 may not redefine those constituent fields of the frame control field that are used to decode the short packet and/or to prevent packet collisions. For example, the packet generation module 110 may not redefine the constituent fields that are used to indicate the length of the short packet, the modulation type, and other information that is used by the second network device to decode the short packet. In other embodiments, the packet generation module 110 may include a zero value (or another suitable value) in a frame length constituent field to indicate that the application data will be transmitted in the frame control field. In some embodiments, the packet generation module 110 may include the application data in an acknowledgement packet. For example, an acknowledgement indicator may be transmitted in a portion of the frame control field and the application data may be transmitted in the remaining portion of the frame control field. After the packet generation module 110 generates the short packet, the transceiver 112 can transmit the short packet from the first network device to the second network device. From block 406, the flow ends.

FIG. 4 describes the first network device transmitting the application data in a short packet if the length of the application data does not exceed the threshold length. In some embodiments, if the length of the application data is equal to the threshold length, the first network device may determine to transmit the application data in a short packet. However, in other embodiments, if the length of the application data is equal to the threshold length, the first network device may determine not to transmit the data in a short packet.

In some embodiments, the network device 102 may support multiple frame control field lengths that can be mapped to a predetermined number of orthogonal frequency-division multiplexing (OFDM) symbols. For example, in existing PLC protocols, the network device may map the 16-byte or the 32-byte frame control field to a single OFDM symbol. In this example, the network device 102 may support other frame control field lengths (for short packet transmission) that can be mapped to one OFDM symbol for consistency and compatibility with the existing PLC protocols. However, in other embodiments, the number of OFDM symbols that are used to transmit the frame control field may not be taken into consideration when configuring the network device to support a different frame control field length. The number of OFDM symbols that are used to transmit the frame control field may vary depending on the length of the frame control field, reliability and performance specifications, operating communication band, and/or other suitable considerations. Depending on the length of application data that will be transmitted, the parameter selection module 108 can select an appropriate frame control field length for transmitting the application data, as described above with reference to FIG. 4.

In some embodiments, the network device 102 may determine not to transmit the application data in the frame control field. In existing PLC protocols, a PLC device may support a payload length of 136 bytes or 520 N bytes, where N is an integer greater than 0. As will be further described in FIG. 5, the PLC device may support a finer granularity of payload field lengths to transmit a short payload.

Figure 5:
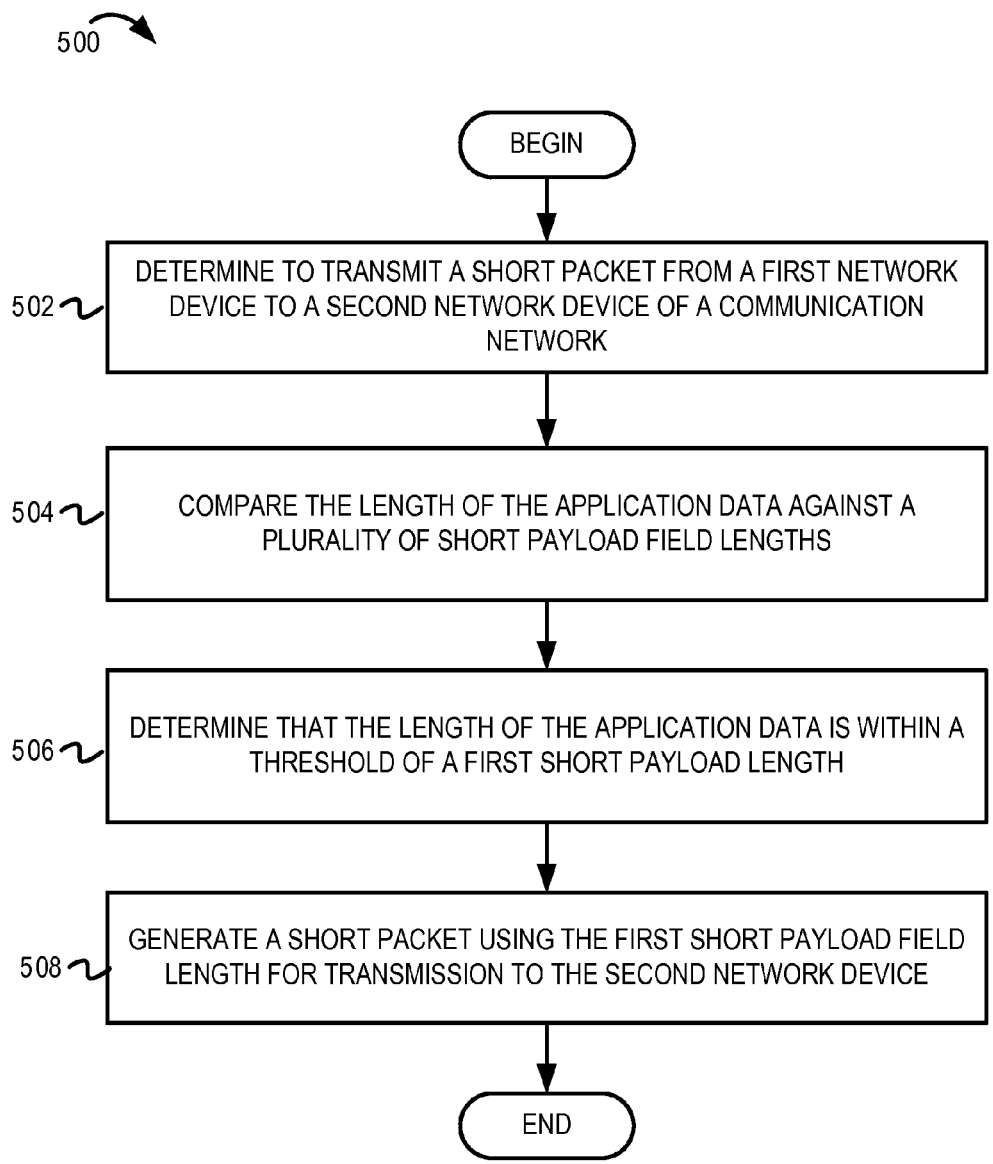
FIG. 5 is a flow diagram illustrating example operations for selecting a payload field length for transmitting application data in a short packet.

FIG. 5 is a flow diagram 500 illustrating example operations for selecting a payload field length for transmitting application data in a short packet. The flow 500 begins at block 502.

At block 502, a first network device determines to transmit a short packet to a second network device of a communication network. For example, the packet evaluation module 106 may compare the length of the application data that will be transmitted with a threshold length to determine whether the application data should be transmitted in a short payload field of the short packet. In some embodiments, the threshold length may be equal to the maximum length of a frame control field. In another embodiment, the threshold length may be a predetermined percentage of the maximum length of the frame control field. In another embodiment, the threshold length may be equal to the maximum length of the short payload field. In another embodiment, the threshold length may be a predetermined percentage of the maximum length of the short payload field. The flow continues at block 504.

At block 504, the first network device compares the length of the application data with a plurality of short payload field lengths. For example, the parameter selection module 108 may compare the length of the application data with a plurality of short payload field lengths. In some embodiments, the first network device may support short payload field lengths for short packet transmission, in addition to longer payload field lengths for conventional PLC protocols. The payload field of a PLC packet typically includes one or more forward error correction (FEC) blocks (also referred to as PHY blocks). The parameter selection module 108 may select a supported FEC block or a combination of two or more of the supported FEC blocks to transmit the application data depending on the length of the application data and the FEC block sizes supported by the second network device. In one embodiment, the first and the second network devices may support smaller FEC block sizes, in addition to conventional FEC block sizes. For example, the network device 102 may support: A) a 24-byte FEC block size that includes 16 bytes of application data and 8 bytes of error correction information, B) a 40-byte FEC block size that includes 32 bytes of application data and 8 bytes of error correction information, C) a 72-byte FEC block size that includes 64 bytes of application data and 8 bytes of error correction information, D) a 264-byte FEC block size that includes 256 bytes of application data and 8 bytes of error correction information, E) a 16-byte FEC block size that includes 16 bytes of application data and no error correction information, F) a 32-byte FEC block size that includes 32 bytes of application data and no error correction information, and/or G) a 64-byte FEC block size that includes 64 bytes of application data and no error correction information. Reducing the granularity of supported payload field lengths and the FEC block sizes can allow the parameter selection module 108 to select an appropriate payload field length, reduce the amount of padding that is added to the application data, and improve data transmission efficiency. In some embodiments, the network devices may support multiples of FEC blocks of the same size in the payload field. For example, instead of supporting one payload field length of 136 bytes, the network devices may support payload field lengths that are a multiple of 136 bytes (e.g., 136*N bytes). In another embodiment, the network devices may support FEC blocks of different sizes within the same payload field. The flow continues at block 506.

At block 506, the first network device determines that the length of the application data is within a threshold of a first short payload field length. For example, the parameter selection module 108 may select the first short payload field length, if the length of the application data is equal to the first short payload field length. As another example, the parameter selection module 108 may select the first short payload field length, if the length of the application data is a predetermined percentage of the first short payload field length. As another example, the parameter selection module 108 may select the first short payload field length if the length of the application data is within a predetermined threshold of the first short payload field length. In some embodiments, the parameter selection module 108 may select one of the smaller FEC block sizes or a combination of two or more of the smaller FEC block sizes to transmit the application data. The parameter selection module 108 may select the FEC block sizes based, at least in part, on the length of the application data and the FEC block sizes supported by the second network device. The selected FEC block sizes may or may not include error correction information based on the type of application and the reliability specifications. For example, to transmit 80 bytes of application data, the parameter selection module 108 may select a 24-byte FEC block and a 72-byte FEC with error correction or a 16-byte FEC block and a 64-byte FEC block without error correction. The flow continues at block 508.

At block 508, the first network device generates the short packet using the first short payload field length for transmission to the second network device. For example, the packet generation module 110 may generate the short packet including a preamble field, a frame control field, and a payload field. The payload field may include the application data. The length of the payload field may be the first short payload field length selected at block 506. The frame control field may include control information identifying the first network device and the second network device. The frame control field may also include an indication that the application data will be transmitted in a short packet. In some embodiments, the frame control field may also include an indication of the first short payload field length. If the payload field is formed by a combination of multiple FEC block sizes, the frame control field may also include an indication of which FEC block sizes were used to form the payload field. In some embodiments, the payload field may be transmitted using a different set of communication techniques (e.g., transmission mode, encoding technique, etc.) as compared to the preamble and frame control fields. In one example of this embodiment, the frame control field may include an indication (e.g., a flag bit) that the payload field will be transmitted using a different set of communication techniques. As another example, the frame control field may specify the communication techniques that will be used to transmit the payload field. From block 508, the flow ends.

Figure 6:
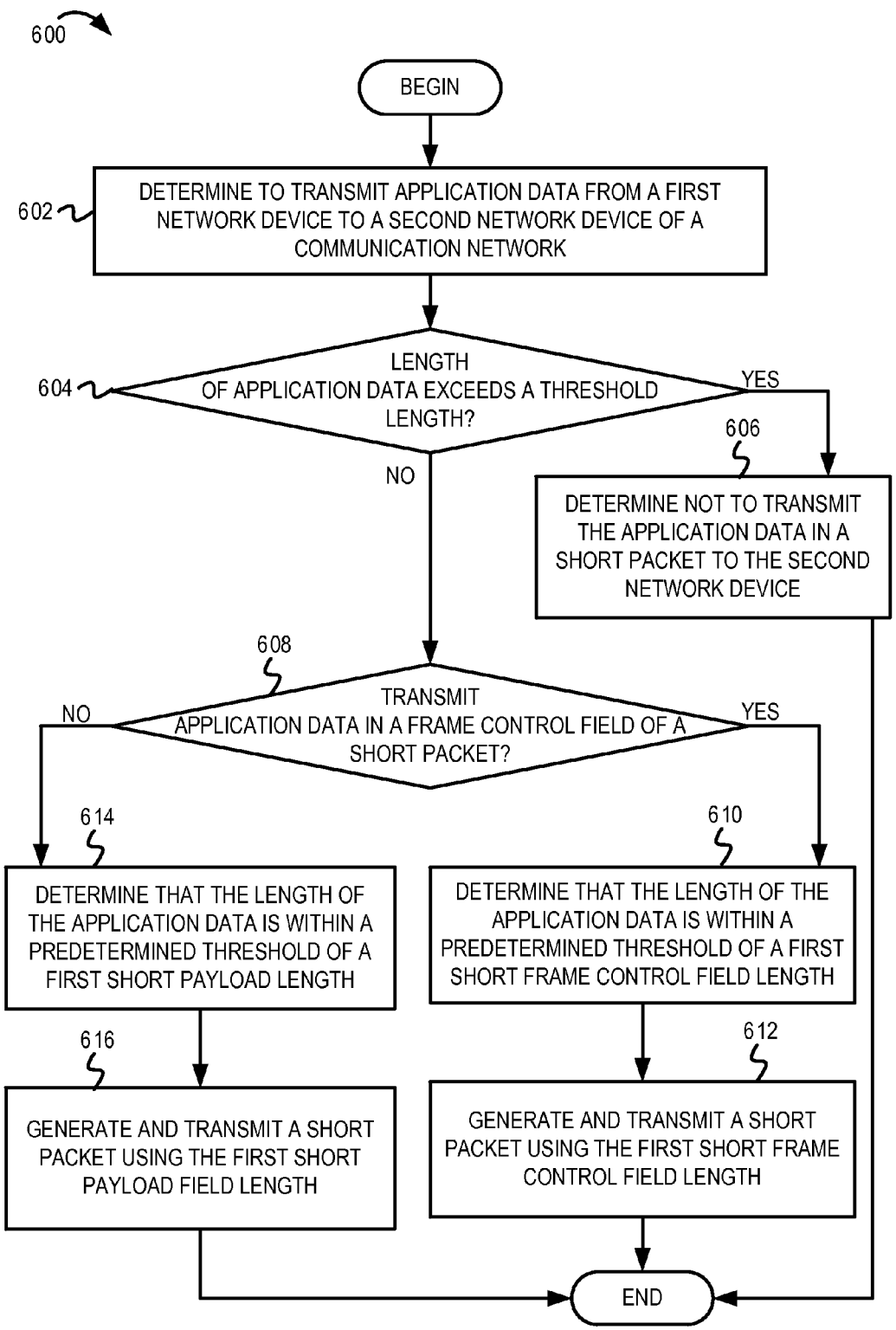
FIG. 6 is a flow diagram illustrating example operations for selecting a packet format for transmission.

FIG. 6 is a flow diagram 600 illustrating example operations for selecting a packet format for transmission. The flow 600 begins at block 602.

At block 602, a first network device determines to transmit application data to a second network device of a communication network. In one example, the first network device and the second network device may be a vehicle or a charging station. As another example, the first network device and the second network device may be PLC modules within a vehicle for intra-vehicular communication. As another example, the first network device and the second network device may each be a PLC device, a WLAN device, a MoCA device, or another network device that implements a suitable wired or wireless communication protocol. The flow continues at block 604.

At block 604, the first network device determines whether the length of application data exceeds a threshold length. In some embodiments, the packet evaluation module 106 may compare the length of the application data with a threshold length to determine whether to use a short packet format to transmit the application data to the second network device. For example, the threshold length may be equal to (or a predetermined percentage of) a maximum frame control field length supported by the first and the second network devices. As another example, the threshold length may be equal to (or a predetermined percentage of) a maximum short payload field length supported by the first and the second network devices. If the length of the application data exceeds the threshold length, the flow continues at block 606. Otherwise, the flow continues at block 608.

At block 606, in response to determining that the length of the application data exceeds the threshold length, the first network device determines not to transmit the application data in a short packet. For example, if the application data cannot be transmitted in the frame control field or a short payload field of the short packet, the first network device can determine to transmit the application data using conventional communication protocols. In one implementation, the packet generation module 110 may generate a PLC packet using conventional PLC protocols, such as HomePlug AV/AV2/GreenPHY, etc. for transmission to the second network device. From block 606, the flow ends.

At block 608, the first network device determines whether to transmit the application data in a frame control field of a short packet. In response to determining to transmit the application data in the short packet, the packet evaluation module 106 may determine whether to transmit the application data in the frame control field or in the short payload field of the short packet. In some embodiments, the packet evaluation module 106 may determine whether to transmit the application data in the frame control field based, at least in part, on the configuration of the first network device, the configuration of the second network device, and/or the type of network devices in the communication network. For example, the packet evaluation module 106 may determine whether to transmit the application data in the frame control field based on whether the second network device can decode application data received in the frame control field, whether the communication network includes legacy network devices, and/or other suitable factors. The packet evaluation module 106 may also determine whether to transmit the application data in the frame control field based on the length of the application data that will be transmitted, whether control information will be transmitted in the frame control field, the amount of control information that will be transmitted, and/or the maximum length of the frame control field. For example, if the length of application data is less than the maximum length of the frame control field, the packet evaluation module 106 may determine to transmit the application data in the frame control field. As another example, if the length of application data exceeds the maximum length of the frame control field but does not exceed the maximum length of the short payload field, the packet evaluation module 106 may determine to transmit the application data in the short payload field instead of transmitting the application data in the frame control field. If the first network device determines to transmit the application data in the frame control field of the short packet, the flow continues at block 610. Otherwise, the first network device determines to transmit the application data in a short payload field and the flow continues at block 614.

At block 610, the first network device determines that the length of the application data is within a predetermined threshold of a first short frame control field length. As described with above reference to FIG. 4, the network device 102 may support multiple frame control fields, each with a different frame control field length. The parameter selection module 108 may select an appropriate frame control field length depending on the length of the application data and the control information that will be transmitted. The flow continues at block 612.

At block 612, the first network device generates the short packet using the first short frame control field length. For example, the packet generation module 110 may generate the short packet including a preamble field and a frame control field. The length of the frame control field may be the first frame control field length selected at block 610. The frame control field may include the control information and the application data. The short packet may not include a payload field. From block 612, the flow ends.

At block 614, the first network device determines that the length of the application data is within a predetermined threshold of a first short payload length. In some embodiments, as described with reference to FIG. 5, the network device 102 may support multiple short payload fields, each with a different payload field length. The parameter selection module 108 may select the short payload field length based, at least in part, on the length of application data that will be transmitted. In some embodiments, the network device 102 may support multiple short FEC block sizes, as described above with reference to FIG. 5. The short payload field may include a short FEC block size or a combination of two or more short FEC block sizes. The parameter selection module 108 may select one or more FEC block sizes to transmit the application data in the short payload field. The flow continues at block 616.

At block 616, the first network device generates the short packet using the first short payload field length. For example, the packet generation module 110 may generate the short packet including a preamble field, a frame control field, and a payload field. The payload field may include the application data. The length of the payload field may be the first short payload field length selected at block 614. From block 616, the flow ends.

Blocks 604 and 608 of FIG. 6 describe the first network device determining whether to transmit a short packet to the second network device, and whether to transmit the application data in the frame control field or the short payload field of the short packet. However, in other embodiments, the first network device may not perform the operations described in blocks 604 and 608 before each transmission. Instead, in one example, the first network device may perform the comparison (described in block 604 and/or block 608) before an initial transmission to the second network device. If the first network device determines to transmit the short packet to the second network device, the first network device may automatically use the short packet for subsequent transmissions to the second network device, without re-executing the comparison operation of block 604. In another embodiment, the first network device may be preconfigured to use the short packet to transmit application data to the second network device. In another embodiment, the first network device may use the short packet to transmit application data depending on the type of application and/or the communication environment. For example, the first network device may use the short packet to transmit application data to the second network device when the first and the second network devices are in a vehicle charging environment or in an intra-vehicular environment (e.g., within a vehicle or within a charging station). Additionally, in some embodiments, the first network device may automatically use the frame control field or the short payload field, without performing the comparison of block 608. In other embodiments, the first network device may be preconfigured to use a specific frame control field length or a specific short payload field length to transmit application data to the second network device.

In some embodiments, as depicted in FIG. 1, the communication network 100 may include a legacy network device 114 that does not support communication of the short packet. Specifically, the legacy network device 114 may not include functionality to generate, transmit, receive, or process the short packet. If the communication network 100 includes the legacy network device 114, the network device 102 may include compatibility information in the transmitted short packet to maintain backwards compatibility with the legacy network device 114, as will be further described below with reference to FIG. 7.

Figure 7:
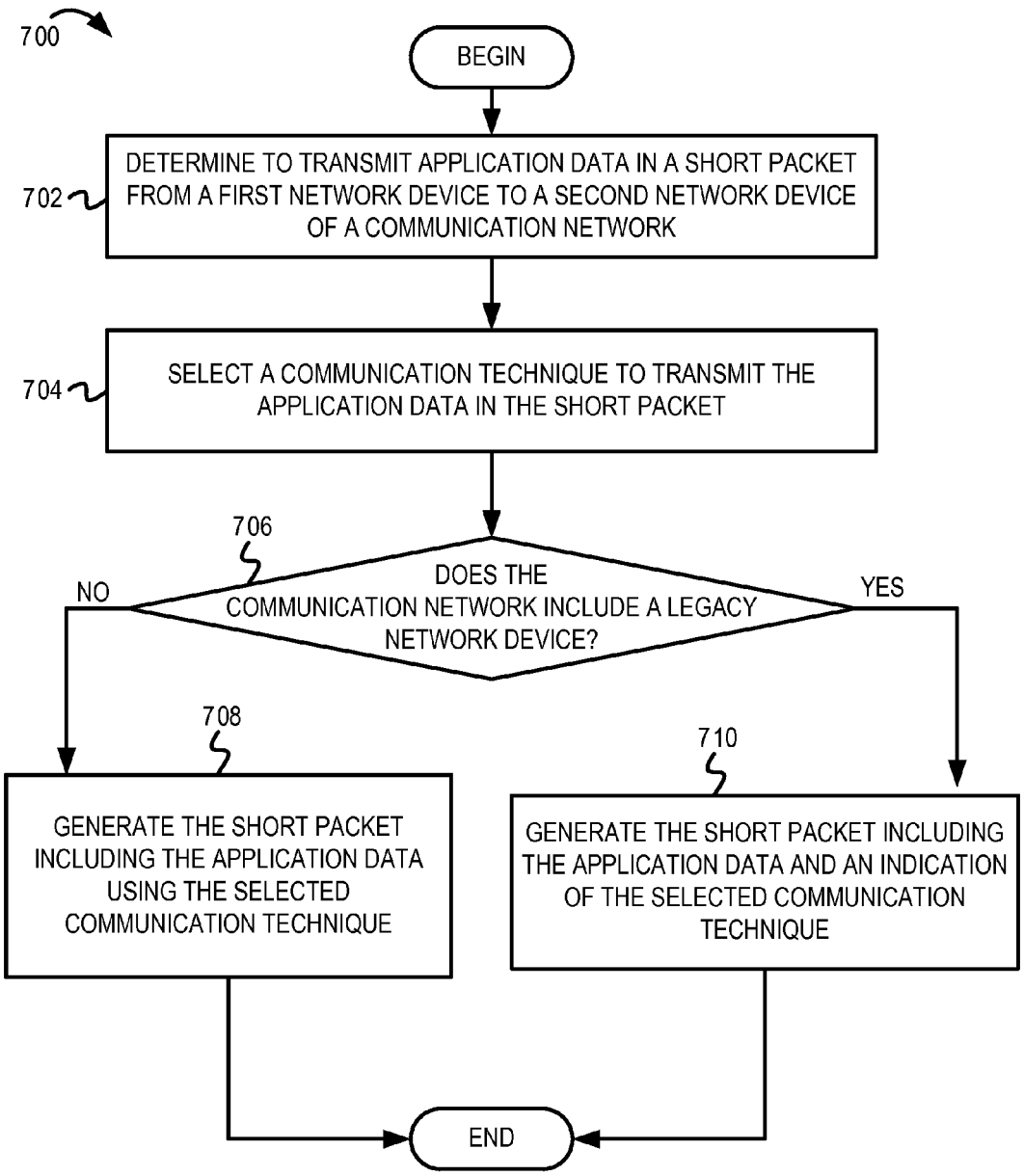
FIG. 7 is a flow diagram illustrating example operations for selecting a communication technique to transmit a short packet in a communication network.

FIG. 7 is a flow diagram 700 illustrating example operations for selecting a communication technique to transmit a short packet in a communication network. The flow 700 begins at block 702.

At block 702, a first network device determines to transmit application data in a short packet to a second network device of a communication network. For example, the packet evaluation module 106 may compare the length of the application data that will be transmitted with a threshold length to determine whether the application data should be transmitted in a short packet, as described with reference to FIG. 6. Additionally, the packet evaluation module 106 may also determine whether the application data should be transmitted in the frame control field or the short payload field of the short packet. The flow continues at block 704.

At block 704, a communication technique is selected to transmit the application data in the short packet. In some embodiments, the first network device and the second network device may support communication techniques that can be used for the generation, transmission, and reception of short packets, as will be further described further below after block 710. The short packet communication techniques can include an encoding technique, a transmission mode, a modulation technique, and/or other suitable packet generation and packet transmission techniques, as will be further described below. The short packet communication techniques for generating and transmitting short packets may use a data rate, communication carrier spacing, sampling frequency, and/or fast Fourier transform (FFT) size, and/or other parameters and specifications to generate and transmit short packets. The parameter selection module 108 may select appropriate communication techniques for generating and/or transmitting the short packet to the second network device. The flow continues at block 706.

At block 706, the first network determines whether the communication network includes a legacy network device. The legacy network device may not support communication of short packets. For example, the legacy network device may be unable to receive and decode application data that was transmitted in the frame control field. As another example, the legacy network device may be unable to receive and decode application data that is transmitted using the communication techniques that allow transmission of short packets. As another example, the legacy network device may be unable to receive and decode application data that is transmitted in a short payload field with a short payload field length. As another example, the legacy network device may not implement functionality to transmit a short packet when the length of the application data is less than a threshold length. In some embodiments, the first network device may determine whether the communication network includes a legacy network device by sniffing communications of other network devices in the communication network. In another embodiment, the first network device may determine whether the communication network includes a legacy network device by requesting communication capability information from other network devices in the communication network. If the communication network does not include a legacy network device, the flow continues at block 708. Otherwise, if the communication network includes a legacy network device, the flow continues at block 710.

At block 708, if the communication network does not include a legacy network device, the first network device generates a short packet including the application data using the selected communication technique. In some embodiments, the application data may be transmitted in a frame control field of a suitable frame control field length. In this embodiment, as described with reference to FIG. 4, the short packet may include a preamble field and the frame control field. The short packet may not include a payload field. The frame control field may include the application data and control information (if needed). In some embodiments, the application data may be transmitted in a short payload field of a suitable short payload field length, as described with reference to FIG. 5. In this embodiment, the short packet may include the preamble field, the frame control field, and the short payload field. In this embodiment, the frame control field may not include application data, but may include an indication of the short payload field length.

In some embodiments, when the communication network does not include a legacy network device, the short packet including the preamble field, the frame control field, and the short payload field (if applicable) may be generated using a communication technique that can be used for communicating short packets, as will be further described below. For example, the frame control field including control information and application data may be encoded using an encoding scheme for transmitting short packets. As another example, both the frame control field and the short payload field may be generated/transmitted using one or more of the short packet communication techniques described below. From block 708, the flow ends.

At block 710, if the communication network includes a legacy network device, the first network device generates a short packet including an indication of the selected communication technique. For example, the packet generation module 110 may include compatibility information in the short packet to maintain backwards compatibility with the legacy network device. The first network device can use various techniques to extend the frame control field to support data transmission while maintaining backwards compatibility with the legacy network device. In some embodiments, the packet generation module 110 may use one or more currently unused bits in the frame control field (e.g., a HomePlug AV frame control field and/or a HomePlug 1.0 frame control field) to indicate the presence of application data in the frame control field. For example, the packet generation module 110 may include a predetermined value in unused bits of a start-of-frame (SOF) delimiter to indicate the presence of application data in the frame control field. As another example, the packet generation module 110 may include a currently unused value in other suitable delimiter bits of the frame control field. In other embodiments, the packet generation module 110 may use one or more currently unused bits in the frame control field to indicate the presence of application data in a short payload field. In some embodiments, the packet generation module 110 may transmit a first value in a predetermined sub-field of the frame control field to indicate that the application data is being transmitted in the frame control field of the short packet. The packet generation module 110 may transmit a second value in the predetermined sub-field to indicate that the application data is being transmitted in a short payload field of the short packet.

In some embodiments, if the frame control field includes the application data, the application data portion of the frame control field may be transmitted using the short packet communication technique (selected at block 704), while the control information portion of the frame control field may be transmitted using a known communication technique that is supported by the legacy network device. In other embodiments, the short payload field may be transmitted using the short packet communication technique, while the frame control field may be transmitted using the known communication technique. The known communication technique can include packet generation techniques and/or packet transmission techniques defined by existing PLC protocols that are supported by the legacy network device. Transmitting the control information using a known communication technique can allow the legacy network device to detect the short packet, determine that the short packet is not intended for the legacy network device, and ignore the application data portion of the short packet. From block 710, the flow ends.

As described above with reference to FIG. 7, the network device 102 that is configured for short packet transmission may support the short packet communication techniques. The short packet communication techniques may support generation, transmission, and reception of short packets, where the length of the application data is less than a threshold length. The following discussion will further describe examples of known communication techniques and short packet communication techniques in a PLC environment. The following discussion will describe a robust transmission mode (or ROBO mode), an encoding scheme, and a carrier spacing for generating and transmitting a short packet.

In existing PLC protocols, a PLC device (e.g., a HomePlug AV/AV2/GP device, an IEEE 1901 device, etc.) typically supports robust transmission modes (also referred to as ROBO modes). Each ROBO mode may represent a different combination of data rate and payload field length. For example, the existing PLC protocols may support a mini-ROBO mode, a standard ROBO mode, and a high-speed ROBO mode. The mini ROBO mode may allow transmission of 136 bytes in the payload field of the PLC packet and generate six OFDM symbols for transmitting the payload field. The standard ROBO mode may allow transmission of 520 bytes in the payload field and generate 19 OFDM symbols for transmitting the payload field. The high-speed ROBO mode may allow transmission of A) 520-bytes in the payload field using 10 OFDM symbols, B) 2*520 bytes in the payload field using 19 OFDM symbols, or C) 3*520 bytes in the payload field using 27 OFDM symbols. However, these ROBO modes that are supported by existing PLC protocols do not support transmission of short packets.

In some embodiments, the network device 102 may be configured to support multiple robust transmission (ROBO) modes for transmitting short packets with various short payload field lengths or frame control field lengths. Because fewer bytes of application data are transmitted in the short packet, multiple copies of the application data may be generated using fewer number of OFDM symbols (e.g., one or two OFDM symbols). In one example, the network device 102 may support a ROBO mode to transmit application data in one or more OFDM symbols of the frame control field (or the short payload field). Each OFDM symbol may include 128 bits of information and each OFDM symbol may be encoded using quadrature phase shift keying (QPSK) modulation, a 1/2 rate forward error correction, and 128-bit FEC block. As another example, the network device 102 may support a ROBO mode to transmit application data in one or more OFDM symbols, where each OFDM symbol may include 256 bits of information and each OFDM symbol may be encoded using QPSK modulation, a 1/2 rate forward error correction, and 256-bit FEC block. In these examples, the network device 102 may use conventional frame control interleaving operations if one OFDM symbol is used to transmit the application data. However, if more than one OFDM symbol is used to transmit the application data, the network device 102 may use alternate interleaving operations that maximally spread copies of each bit of the application data over time and frequency.

In existing PLC protocols, a PLC device typically use a turbo code for forward error correction (FEC). A turbo coder may include two convolutional coders separated by an interleaver. In one example, each of the convolutional coders may have a 2/3 FEC rate. In this example, every two bits provided at the input of the convolution coder may yield an output of 3 bits. Thus, the convolutional coder with a 2/3 FEC rate may provide a 1-bit redundancy. The resultant output bits generated by the turbo coder may be "punctured" to further reduce the forward error correction rate to 16/21 or 8/9 to transmit the payload field. Some of the redundant bits may be removed from the resultant output of the turbo coder to minimize the number the redundant bits that are transmitted. Although turbo codes enable data transmission at an almost ideal/theoretical capacity performance, turbo codes may rely on the availability of large data block sizes (e.g., 520 bytes of data). The turbo codes may not yield the desired performance for transmitting short packets.

In some embodiments, the network device 102 may be configured to support a convolutional coding mode in addition to the turbo coding mode described above. The network device 102 may activate the convolutional coding mode by disabling the second convolutional coder and the interleaver of the turbo coder. In the convolution coding mode, the network device 102 may provide the application data that will be transmitted only to the first convolutional coder. The first convolutional coder may provide a FEC rate of 2/3. The resultant output of the first convolutional coder may be punctured to yield an output at any suitable FEC rate. In addition, a receiving network device may perform similar operations to decode the received the short packet and extract the application data from the received short packet. By using a single convolutional coder instead of multiple convolutional coders, power consumption at the transmitting and receiving network devices can be reduced.

FIG. 7 describes the first network device maintaining backwards compatibility with legacy network devices that do not support short packet communication when the communication network includes a legacy network device. However, in other embodiments, the first network device may maintain backwards compatibility irrespective of whether the communication network includes a legacy network device. For example, the network device 102 may include one or more bits to indicate that the application data will be transmitted in a short packet, irrespective of whether the communication network includes a legacy network device. In some embodiments, only the application data may be transmitted using a short packet communication technique, irrespective of whether the communication network includes a legacy network device. For example, the application data portion of the frame control field may be transmitted using a short packet communication technique, while the control information portion of the frame control field may be transmitted using a known communication technique that is supported by the legacy device. As another example, the short payload field may be transmitted using a short packet communication technique, while the frame control field may be transmitted using a known communication technique, irrespective of whether the communication network includes a legacy network device. In some embodiments, the short packet may also include an indication of the communication technique that will be used to transmit the application data.

Figure 8:
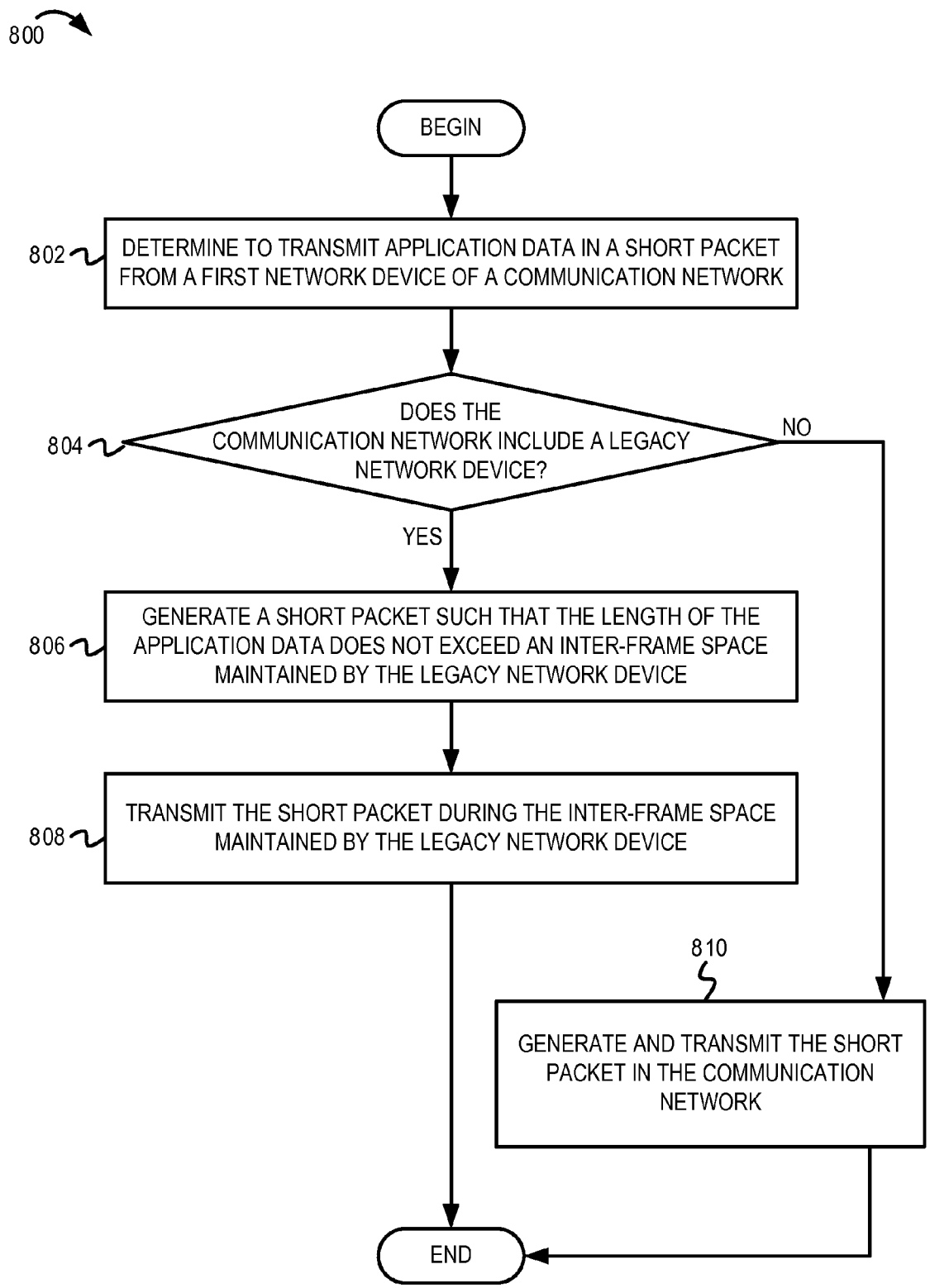
FIG. 8 is a flow diagram illustrating example operations for transmitting a short packet in a communication network that includes a legacy network device.
Figure 9:
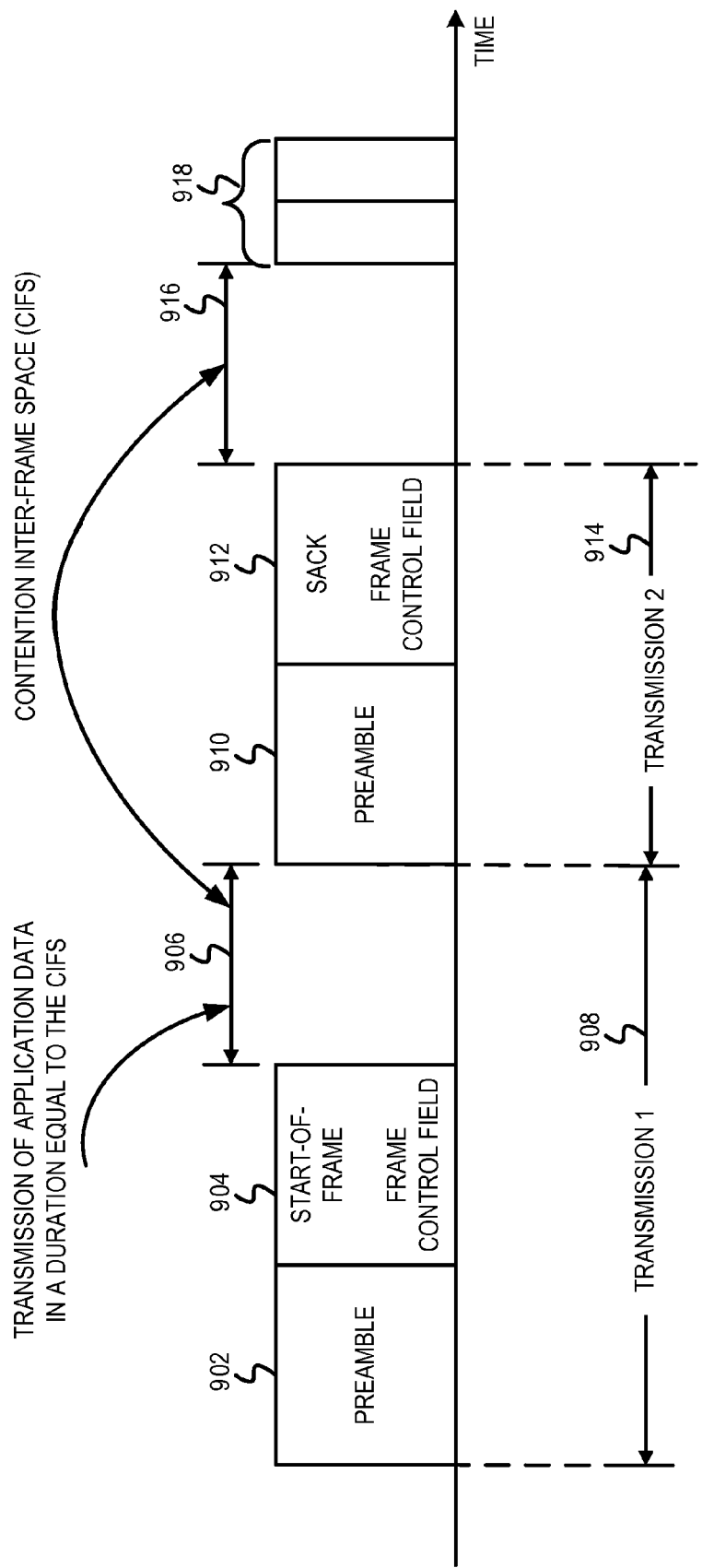
FIG. 9 is a timing diagram illustrating an example mechanism for transmitting a short packet based on an inter-frame space.

In some embodiments, the network device 102 may transmit an amount of application data that is less than or equal to an inter-frame space maintained by the legacy network device 114 to share the communication medium with the legacy network device 114, as described in FIGS. 8 and 9.

FIG. 8 is a flow diagram 800 illustrating example operations for transmitting a short packet in a communication network that includes a legacy network device. The flow 800 begins at block 802.

At block 802, a first network device of a communication network determines to transmit application data in a short packet. For example, the packet evaluation module 106 may compare the length of the application data that will be transmitted with a threshold length to determine whether the application data should be transmitted in a short packet, as described above with reference to FIG. 6. Additionally, the packet evaluation module 106 may also determine whether the application data should be transmitted in the frame control field or the short payload field of the short packet. The flow continues at block 804.

At block 804, the first network device determines whether the communication network includes a legacy network device. The legacy network device 114 may not include functionality to generate, transmit, receive, or process the short packet. The first network device may determine whether the communication network includes a legacy network device using techniques described above with reference to FIG. 7. If the communication network does not include a legacy network device, the flow continues at block 810. Otherwise, the flow continues at block 806.

At block 806, the first network device generates a short packet such that the length of the application data does not exceed an inter-frame space maintained by the legacy network device. FIG. 9 depicts two successive transmissions—transmission 908 and transmission 914. The transmission 908 includes a preamble field 902 and a start-of-frame (SOF) delimiter 904 of a frame control field. In response to detecting the preamble 902 and the SOF delimiter 904 from the network device 102, the legacy network device 114 typically backs-off and refrains from initiating transmissions for a predefined time interval 906. This predefined time interval may be referred to as a contention window interframe space (CIFS) that is maintained by the legacy network device 114. Transmitting the application data during the CIFS time interval can ensure that transmissions of the legacy network device 114 do not overlap or interfere with transmission of application data in the frame control field (or short payload field) of the short packet. This can also enable the legacy network device 114 to estimate the length of the short packet, when the transmission of the short packet will end, and when to start contending for the shared communication channel. Referring back to FIG. 8, the flow continues at block 808.

At block 808, the first network device transmits the short packet during the inter-frame space maintained by the legacy network device. Referring to FIG. 9, in some embodiments, one or more bits of the SOF delimiter 904 may be used to indicate whether application data will be transmitted in a short packet. After transmitting the SOF delimiter 904, the network device 102 may transmit the application data during the CIFS time interval 906. In some embodiments, the application data may be transmitted in the remaining portion of the frame control field, as described with reference to FIG. 4. In other embodiments, the application data may be transmitted in a short payload field, as described with reference to FIG. 5. In the example of FIG. 9, the network device 102 transmits the application data during the CIFS time interval 906. The duration for which the application data is transmitted may be less than or equal to the CIFS time interval maintained by the legacy network device 114. In response to receiving the application data, the network device 104 may initiate the transmission 914. The network device 104 may transmit a preamble field 910 and a selective acknowledgement (SACK) delimiter 912 in the frame control field. The legacy network device 114 may detect the SACK delimiter 912 and may initiate another CIFS time interval 916. In some embodiments, the network device 104 may continue to transmit application data during the CIFS time interval 916, as described above. If the legacy network device 114 does not detect another delimiter after the CIFS time interval 916 elapses, the legacy network device 114 can transmit priority information in contention slots 918 to contend for control of the shared communication channel. From block 808, the flow ends.

At block 810, if the communication network does not include a legacy network device, the first network device generates the short packet for transmission in the communication network. If the communication network does not include a legacy network device, the first network device may generate the short packet without taking the CIFS time interval into consideration. The first network device may generate the short packet by including the application data in either the frame control field or a short payload field of the short packet, as described above with reference to FIGS. 3-6. From block 810, the flow ends.

In existing PLC protocols, a PLC device may have stringent symbol synchronization and timing specifications to achieve good performance. For this, the transmitting and receiving PLC devices may have network level coordination (e.g., beacon transmission for coarse timing alignment) and sophisticated signal processing for packet synchronization. However, timing misalignment may result in non-orthogonality of communication carriers which, in turn, may result in performance degradation. In some embodiments, the network device can relax timing specifications to transmit the short packet, as will be further described in FIG. 10.

Figure 10:
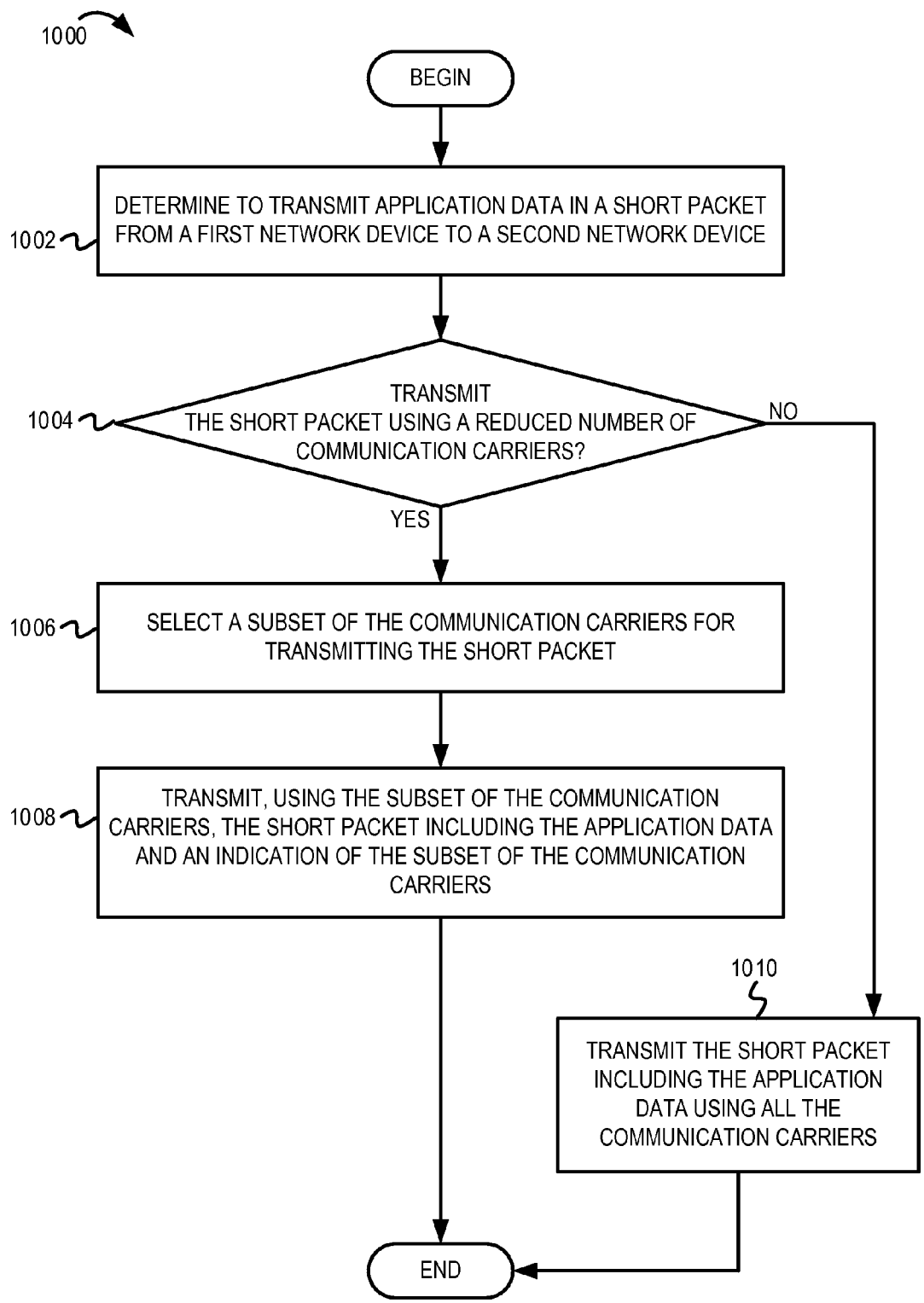
FIG. 10 is a flow diagram illustrating example operations for transmitting a short packet using a reduced number of communication carriers.

FIG. 10 is a flow diagram 1000 illustrating example operations for transmitting a short packet using a reduced number of communication carriers. The flow 1000 begins at block 1002.

At block 1002, a first network device determines to transmit application data in a short packet to a second network device. For example, the packet evaluation module 106 may compare the length of the application data that will be transmitted with a threshold length to determine whether the application data should be transmitted in a short packet, as described above with reference to FIG. 6. Additionally, the packet evaluation module 106 may also determine whether the application data should be transmitted in the frame control field or the short payload field of the short packet. The flow continues at block 1004.

At block 1004, the first network device determines whether to transmit the short packet using a reduced number of communication carriers. In some embodiments, the first network device and the second network device may support communication techniques that can be used for the generation/transmission/reception of short packets. The communication techniques can indicate the number and spacing of communication carriers (also referred to as communication sub-carriers) that can be used to generate and transmit the short packet. In some embodiments, the first network device may relax timing specifications by increasing the spacing between the communication carriers and reducing the number of communication carriers that are used to transmit the short packet. In some embodiments, the first network device can determine whether to use the reduced number of communication carriers based, at least in part, on communication capabilities of the first network device and communication capabilities of the second network device. For example, the first network device may determine to transmit the short packet on all the communication carriers if the first network device and/or the second network device do not support communication using a reduced number of communication carriers. If it is determined to transmit the short packet using a reduced number of communication carriers, the flow continues at block 1006. Otherwise, the flow continues at block 1010.

At block 1006, the first network device selects a subset of the communication carriers for transmitting the short packet. Transmitting the application data on fewer communication carriers can reduce the number of FFT samples and the power consumed by the first network device and the second network device. To transmit the short packet, the first network device may increase the spacing between the communication carriers, reduce the number of communication carriers, and/or reduce the number of FFT samples. In some embodiments, the first network device may use a butterfly FFT process to determine the FFT of the application data that will be transmitted. The first network device typically uses two constituent FFT modules to generate the resultant FFT output. However, to reduce the number of FFT samples and to transmit a short packet, the first network device may disable one of the constituent FFT modules. In some embodiments, to reduce the FFT size and increase the communication carrier spacing, the first network device may mask every other (or alternate) communication carriers. For example, the first network device may use communication carriers 1, 3, 5, 7, etc. to transmit the short packet, and may mask communication carriers 2, 4, 6, etc. The first network device may use other suitable techniques to increase the communication carrier spacing. For example, to transmit a PLC packet using HomePlug AV/GreenPHY, the first network device may use 917 communication carriers with a carrier spacing of 24.414 KHz, a sampling frequency of 75 MHz, and an FFT size of 3072 samples. However, to transmit a short packet, the first network device may use a carrier spacing of 48.828 KHz and an FFT size of 1536 samples. The above example describes doubling the communication carrier spacing and halving the FFT size. However, in other embodiments, the first network device may increase the communication carrier spacing and reduce the FFT size by other suitable factors. The flow continues at block 1008.

At block 1008, the first network device transmits, using the subset of the communication carriers, the short packet including the application data and an indication of the subset of the communication carriers. In some embodiments, the first network device may transmit the short packet by masking unused communication carriers. For example, the first network device may transmit a zero value on the unused communication carriers. In some embodiments, the first network device may also indicate which communication carriers were used to transmit the application data. This can allow the second network device to properly receive and decode the application data. In some implementations, the second network device may first resolve/decode the information transmitted on all the communication carriers and then discard the unused communication carriers. In other implementations, the second network device may not resolve/decode the information transmitted on the masked communication carriers. In another embodiment, the first network device may transmit an indication of the communication carrier spacing in the short packet. The second network device may determine which of the communication carriers were used at the first network device based, at least in part, on knowledge of the communication carrier spacing. From block 1008, the flow ends.

At block 1010, if it is determined not to transmit the short packet using a reduced number of communication carriers, the first network device transmits the short packet including the application data using all the communication carriers. The first network device may generate the short packet by including the application data in either the frame control field or a short payload field of the short packet. The first network device may then transmit the short packet on all the communication carriers to the second network device. In other words, the first network device may not mask any of the communication carriers while transmitting the short packet. From block 1010, the flow ends.

FIG. 10 describes the first network device transmitting an indication of the communication carriers to the second network device. However, in other embodiments, the second network device may have a priori knowledge of which communication carriers were used by the first network device to transmit the short packet. In other embodiments, the second network device may transmit to the first network device an indication of which communication carriers should be used to transmit the short packet from the first network device.

It should be understood that FIGS. 1-10 are examples meant to aid in understanding embodiments and should not be used to limit embodiments or limit scope of the claims. Embodiments may comprise additional circuit components, different circuit components, and/or may perform additional operations, fewer operations, operations in a different order, operations in parallel, and some operations differently. FIGS. 1-10 describe operations for transmitting a short packet in a PLC environment. However, in other embodiments, the operations for transmitting a short packet may be extended to other communication networks and communication protocols. For example, the operations for transmitting application data in the short packet may be executed by network devices that implement WLAN communication protocols (e.g., IEEE 802.11 communication protocols), MoCA communication protocols, Ethernet communication protocols, G.hn home networking protocols, and so on. In other embodiments, the operations for transmitting a short packet may be extended to a combination of communication protocols. For example, the operations for transmitting application data in the short packet may be executed using a combination of PLC protocols and WLAN communication protocols.

In some embodiments, the network devices 102 and 104 may exchange both short packets and long packets. For example, long packets may refer to packets that are transmitted using existing communication protocols. With reference to the PLC protocols, a long PLC packet may have a payload of 136 bytes or 520*N bytes. The network devices 102 and 104 may exchange long packets to execute diagnostic operations, link establishment operations, etc. The network devices 102 and 104 may exchange short packets after the communication link is established. In one embodiment, the network device 102 may determine whether to transmit the short packet or the long packet depending on the type of application and/or the type of operations being executed. In another embodiment, the network device 102 may determine whether to transmit the short packet or the long packet depending on the amount of application data scheduled to be transmitted, as described above with reference to FIG. 6.

In some embodiments, the communication network may include a legacy network device 114 that may not support the short packet communication techniques that can be used for communication of short packets. For example, the legacy network device 114 may not support forward error correction using a single convolutional coder. In this example, the network device 102 may use the convolutional coding mode only to encode the short payload field, and/or the payload portion of the frame control field of the short packet. The network device 102 may continue to use the turbo coding mode (or other known encoding modes) to encode the preamble field and control information portion of the frame control field. Additionally, the network device 102 may also include one or more bits in the frame control field to indicate which encoding mode was used to encode the application data. This can allow the receiving network device to execute appropriate decoding operations to decode the application data from the short packet. As another example, the legacy network device 114 may not support decoding application data or information that is transmitted using the short packet communication techniques that employ certain communication carrier spacing, ROBO modes, and/or other parameters and specifications for generating and transmitting short packets. The network device 102 may use the short packet communication techniques to transmit the short payload field or the payload portion of the frame control field of the short packet. The network device 102 may continue to use the known communication techniques to transmit the preamble field and control information portion of the frame control field. The network device 102 may also include one or more bits in the frame control field to specify the short packet communication techniques that were used to transmit the application data. Although some examples describe the network devices implementing a convolutional coding mode and/or a turbo coding mode, it is noted that the network devices may also implement other types of encoding modes, such as a low-density parity-check (LDPC) coding mode.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "circuit," "module," "unit," or "system." Furthermore, aspects of the present disclosure may take the form of a computer program product embodied in one or more computer readable medium(s) having computer readable program code embodied thereon.

Any combination of one or more non-transitory computer readable medium(s) may be utilized. Non-transitory computer-readable media comprise all computer-readable media, with the sole exception being a transitory, propagating signal. The non-transitory computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code embodied on a computer readable medium for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 11:
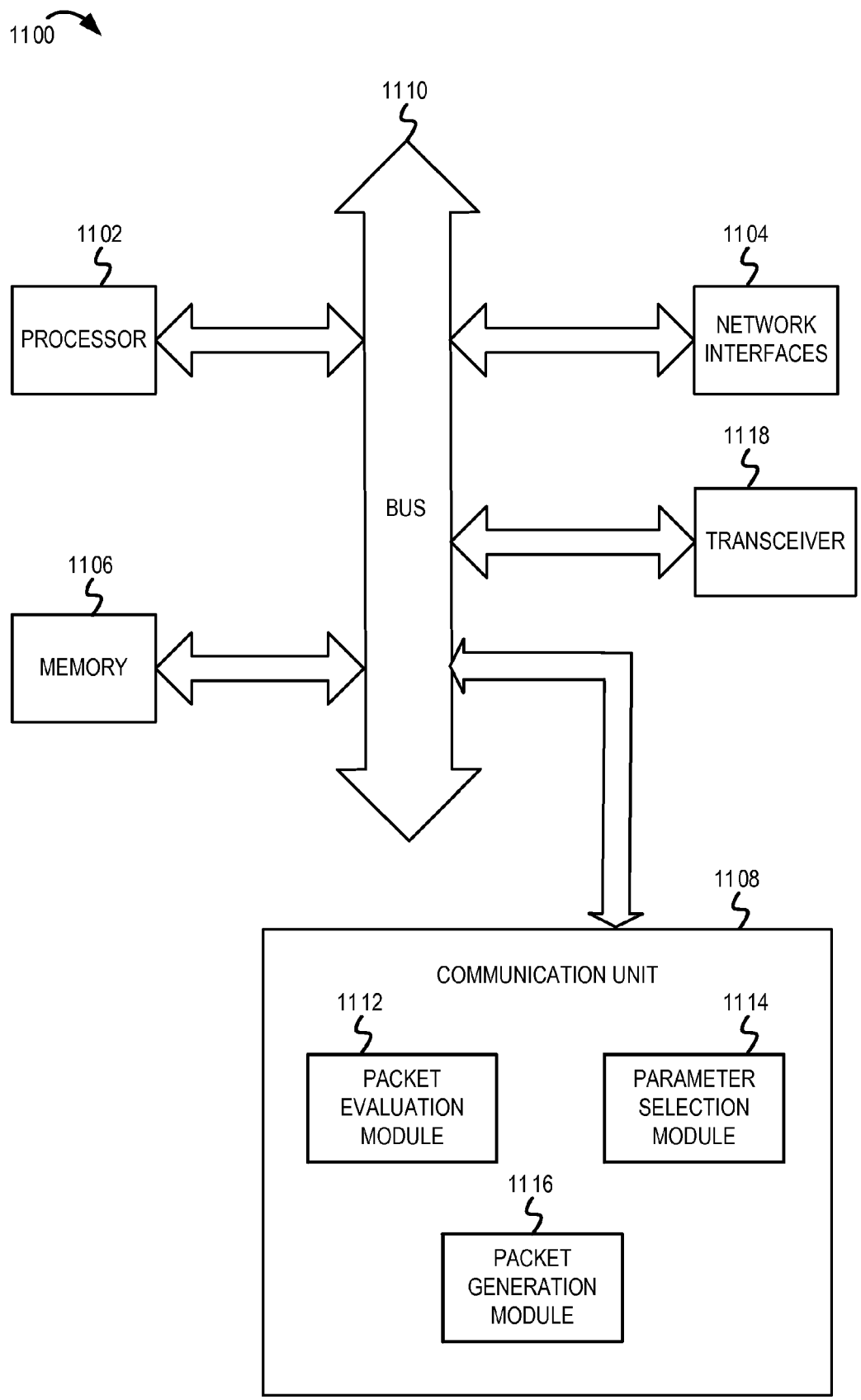
FIG. 11 is a block diagram of one embodiment of an electronic device including a mechanism for transmitting a short packet in a communication network.

FIG. 11 is a block diagram of one embodiment of an electronic device 1100 including a mechanism for transmitting a short packet in a communication network. In some embodiments, the electronic device 1100 may be a communication component within a system, such as a plug-in electric vehicle (PEV), a hybrid electric vehicle, an electric vehicle supply equipment (EVSE or charging station), a gas-powered vehicle, an aircraft, electronic machinery, or another system with communication capabilities. In another embodiment, the electronic device 1100 may be a desktop computer, a laptop computer, a tablet computer, a mobile phone, a smart appliance, a PLC device, a gaming console, a network bridging device, an access point, or other electronic device with communication capabilities. The electronic device 1100 includes a processor 1102 (possibly including multiple processors, multiple cores, multiple nodes, and/or implementing multi-threading, etc.). The electronic device 1100 includes memory 1106. The memory 1106 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of computer-readable storage media. The electronic device 1100 also includes a bus 1110 (e.g., PCI, ISA, PCI-Express, HyperTransport®, InfiniBand®, NuBus, AHB, AXI, etc.), and network interfaces 1104. The processor 1102, the memory 1106, and the network interfaces 1104 are coupled with the bus 1110. The network interfaces 1104 may include a wireless network interface (e.g., a WLAN interface, a Bluetooth® interface, a WiMAX interface, a ZigBee® interface, a Wireless USB interface, etc.) and/or a wired network interface (e.g., a PLC interface, an Ethernet interface, etc.). The electronic device 1100 includes a transceiver 1118. The transceiver 1118 may include a receiver and a transmitter as described above with reference to FIG. 1. In some embodiments, the transceiver 1118 may be implemented as part of the network interface 1104. In other embodiments, the transceiver 1118 may be implemented separate from the network interface 1104 and may be coupled with the bus 1110, as depicted in FIG. 11.

The electronic device 1100 also includes a communication unit 1108 that is coupled with the bus 1110. The communication unit 1108 includes a packet evaluation module 1112, a parameter selection module 1114, and a packet generation module 1116. The packet evaluation module 1112 may determine whether to transmit the application data in a short packet. Additionally, the packet evaluation module 1112 may also determine whether to transmit the application data in a frame control field or a short payload field of the short packet. In some embodiments, the parameter selection module 1114 may select an appropriate frame control field length or a short payload field length based, at least in part, on the application data, as described with reference to FIGS. 1-6. The parameter selection module 1114 may also select a communication technique for generating the short packet and/or transmitting the short packet as described above with reference to FIGS. 7-10. The packet generation module 1116 may generate the short packet using the selected communication technique.

Any one of these functionalities may be partially (or entirely) implemented in hardware and/or on the processor 1102. For example, the functionality may be implemented with a system-on-a-chip (SoC), an application specific integrated circuit (ASIC), in logic implemented in the processor 1102, in a co-processor on a peripheral device or card, etc. Further, realizations may include fewer or additional components not illustrated in FIG. 11 (e.g., video cards, audio cards, additional network interfaces, peripheral devices, etc.). For example, in addition to the processor 1102 coupled with the bus 1110, the communication unit 1108 may comprise at least one additional processor. As another example, the communication unit 1108 may include one or more radio transceivers, processors, memory, and other logic to implement the communication protocols and related functionality. The processor 1102, the memory 1106, and the network interfaces 1104 are coupled to the bus 1110. Although illustrated as being coupled to the bus 1110, the memory 1106 may be coupled to the processor 1102.

While the embodiments are described with reference to various implementations and exploitations, it will be understood that these embodiments are illustrative and that the scope of the disclosure is not limited to them. In general, techniques for short packet communication in a communication network as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the disclosure.

What is claimed is:

1. A method for transmitting packets, comprising:
   determining to transmit application data from a first network device to a second network device of a powerline communication network;
   comparing a length of the application data with a threshold length;
   in response to determining that the length of the application data does not exceed the threshold length, selecting a short packet transmission technique to transmit an application data portion of a frame control field of a short packet and a known packet transmission technique to transmit a control information portion of the frame control field of the short packet, wherein the short packet transmission technique includes inserting the application data into the application data portion of the frame control field of the short packet, wherein the known packet transmission technique is supported by a legacy network device on the powerline communication network and the short packet transmission technique is not supported by the legacy network device; and
   transmitting the short packet on the powerline communication network.

2. The method of claim 1, further comprising:
   determining to transmit the application data in a payload field of the short packet in response to determining that the length of the application data exceeds the threshold length.

3. The method of claim 1, wherein selecting the short packet transmission technique and the known packet transmission technique includes performing at least one member of the group consisting of:
   selecting a first modulation technique for the application data portion of the frame control field and selecting a second modulation technique different from the first modulation technique for the control information portion of the frame control field;
   selecting a first transmission mode for the application data portion of the frame control field and selecting a second transmission mode different from the first transmission mode for the control information portion of the frame control field;

selecting a first carrier spacing for the application data portion of the frame control field and selecting a second carrier spacing different from the first carrier spacing for the control information portion of the frame control field; and selecting a first sampling frequency for the application data portion of the frame control field and selecting a second sampling frequency different from the first sampling frequency for the control information portion of the frame control field.

4. The method of claim 1, wherein the frame control field of the short packet comprises:
an indication that the frame control field includes the application data; and
an indication of the length of the application data.

5. The method of claim 1, further comprising performing at least one member of the group consisting of:
encoding the application data portion of the frame control field using a first FFT size and encoding the control information portion of the frame control field using a second FFT size different from the first FFT size; and
encoding the application data portion of the frame control field using a first encoding scheme and encoding the control information portion of the frame control field using a second encoding scheme mode different from the first encoding scheme.

6. The method of claim 1, further comprising:
determining that the powerline communication network includes the legacy network device that does not support the short packet transmission technique.

7. The method of claim 1, further comprising:
transmitting an indication that the short packet transmission technique is applied to the application data.

8. A first network device comprising:
a processor; and
a memory to store machine executable instructions, which when executed by the processor, cause the first network device to:
determine to transmit application data to a second network device of a powerline communication network;
compare a length of the application data with a threshold length;
in response to a determination that the length of the application data does not exceed the threshold length, selecting a short packet transmission technique to transmit an application data portion of a frame control field of a short packet and a known packet transmission technique to transmit a control information portion of the frame control field of the short packet, wherein the short packet transmission technique includes insertion of the application data into the application data portion of the frame control field of the short packet, wherein the known packet transmission technique is supported by a legacy network device on the powerline communication network and the short packet transmission technique is not supported by the legacy network device; and
transmit the short packet on the powerline communication network.

9. The first network device of claim 8, wherein the instructions, which when executed by the processor, further cause the first network device to:
determining to transmit the application data in a payload field of the short packet in response to a determination that the length of the application data exceeds the threshold length.

10. The first network device of claim 8, wherein the frame control field of the short packet comprises:
an indication that the frame control field includes the application data; and
an indication of the length of the application data.

11. The first network device of claim 8, wherein the instructions, to cause the first network device to select the short packet transmission technique and the known packet transmission technique include instructions to perform at least one member of the group consisting of:
select a first modulation technique for the application data portion of the frame control field and select a second modulation technique different from the first modulation technique for the control information portion of the frame control field;
select a first transmission mode for the application data portion of the frame control field and select a second transmission mode different from the first transmission mode for the control information portion of the frame control field;
select a first carrier spacing for the application data portion of the frame control field and select a second carrier spacing different from the first carrier spacing for the control information portion of the frame control field;
select a first sampling frequency for the application data portion of the frame control field and select a second sampling frequency different from the first sampling frequency for the control information portion of the frame control field;
encoding the application data portion of the frame control field using a first FFT size and encoding the control information portion of the frame control field using a second FFT size different from the first FFT size; and
encoding the application data portion of the frame control field using a first encoding scheme and encoding the control information portion of the frame control field using a second encoding scheme mode different from the first encoding scheme.

12. A non-transitory machine-readable storage medium having machine executable instructions stored therein, the machine executable instructions comprising instructions to:
determine to transmit application data to a second network device of a powerline communication network;
compare a length of the application data with a threshold length;
in response to a determination that the length of the application data does not exceed the threshold length, selecting a short packet transmission technique to transmit an application data portion of a frame control field of a short packet and a known packet transmission technique to transmit a control information portion of the frame control field of the short packet, wherein the short packet transmission technique includes insertion of the application data into the application data portion of the frame control field of the short packet, wherein the known packet transmission technique is supported by a legacy network device on the powerline communication network and the short packet transmission technique is not supported by the legacy network device; and
transmit the short packet on the powerline communication network.

13. The non-transitory machine-readable storage medium of claim 12, wherein said instructions further comprise instructions to perform at least one member of the group consisting of:

select a first modulation technique for the application data portion of the frame control field and select a second modulation technique different from the first modulation technique for the control information portion of the frame control field;

select a first transmission mode for the application data portion of the frame control field and select a second transmission mode different from the first transmission mode for the control information portion of the frame control field;

select a first carrier spacing for the application data portion of the frame control field and select a second carrier spacing different from the first carrier spacing for the control information portion of the frame control field; and select a first sampling frequency for the application data portion of the frame control field and select a second sampling frequency different from the first sampling frequency for the control information portion of the frame control field.

14. The non-transitory machine-readable storage medium of claim 12, wherein the wherein the instructions further include instructions to determine that the powerline communication network includes the legacy network device that does not support the short packet transmission technique.

15. The non-transitory machine-readable storage medium of claim 12, wherein the machine executable instructions further comprise instructions to:
determining to transmit the application data in a payload field of the short packet in response to a determination that the length of the application data exceeds the threshold length.

16. The non-transitory machine-readable storage medium of claim 12, wherein the machine executable instructions further comprise instructions to perform at least one member of the group consisting of:
encoding the application data portion of the frame control field using a first FFT size and encoding the control information portion of the frame control field using a second FFT size different from the first FFT size; and
encoding the application data portion of the frame control field using a first encoding scheme and encoding the control information portion of the frame control field using a second encoding scheme mode different from the first encoding scheme.

17. The non-transitory machine-readable storage medium of claim 12, wherein the machine executable instructions further comprise instructions to:
determine to transmit the application data in the short packet based, at least in part, on at least one member of a group consisting of a communication capability of the first network device, a communication capability of the second network device, and an application that generated the application data.

18. The non-transitory machine-readable storage medium of claim 12, wherein the machine executable instructions further comprise instructions to:
determine to transmit the application data in a payload field of the short packet when the length of the application data exceeds a first threshold length but does not exceed a second threshold length.

19. The non-transitory machine-readable storage medium of claim 18, wherein,
the first threshold length is a predetermined frame control field length, and
the second threshold length is a predetermined payload field length.

20. The non-transitory machine-readable storage medium of claim 12, wherein the machine executable instructions further comprise instructions to:
determine that the powerline communication network includes the legacy network device; and
generate the short packet based, at least in part, on a time interval associated with the legacy network device.

21. The non-transitory machine-readable storage medium of claim 20, wherein the time interval is a contention window inter-frame space (CIFS).

22. The non-transitory machine-readable storage medium of claim 20, wherein the machine executable instructions further comprise instructions to:
transmit a start-of-frame delimiter of the short packet in the powerline communication network, wherein the legacy network device does not initiate a communication for the time interval in response to detecting the start-of-frame delimiter; and
transmit a remainder of the short packet during the time interval.

23. The non-transitory machine-readable storage medium of claim 12, wherein the length of the application data is less than a smallest predefined payload field length specified by a protocol associated with the known packet transmission technique.

24. The method of claim 2, further comprising selecting a payload field length that is less than a smallest predefined payload field length specified by a communication protocol associated with the known packet transmission technique.

25. The method of claim 1, further comprising:
determining to transmit the application data in the short packet based, at least in part, on at least one member of a group consisting of a communication capability of the first network device, a communication capability of the second network device, and an application that generated the application data.

26. The method of claim 1, further comprising:
determining to transmit the application data in a payload field of the short packet when the length of the application data exceeds a first threshold length but does not exceed a second threshold length.

27. The method of claim 26, wherein,
the first threshold length is a predetermined frame control field length, and
the second threshold length is a predetermined payload field length.

28. The method of claim 1, wherein:
the short packet transmission technique includes at least one member of a group consisting of a first encoding technique, a first transmission mode, and a first modulation technique, and
the known packet transmission technique includes at least one member of a group consisting of a second encoding technique, a second transmission mode, and a second modulation technique.

29. The method of claim 1, further comprising:
determining that the powerline communication network includes the legacy network device; and
generating the short packet based, at least in part, on a time interval associated with the legacy network device.

30. The method of claim 29, wherein the time interval is a contention window inter-frame space (CIFS).

31. The method of claim 29, further comprising:
transmitting a start-of-frame delimiter of the short packet in the powerline communication network, wherein the legacy network device does not initiate a communication for the time interval in response to detecting the start-of-frame delimiter; and transmitting a remainder of the short packet during the time interval.

32. The method of claim 1, further comprising:

selecting a plurality of communication carriers for transmitting the application data in the short packet.

33. The method of claim 32, wherein the short packet includes an indication of the plurality of communication carriers used for transmitting the short packet.

34. The first network device of claim 8, wherein the a payload field length of the short packet is less than a smallest predefined payload field length specified by a protocol associated with the known packet transmission technique.

35. The first network device of claim 8, wherein the selection of the short packet transmission technique to transmit the application data and the known packet transmission technique to transmit the control information is in response to a determination that the powerline communication network includes the legacy network device that does not support the short packet transmission technique.

36. The first network device of claim 8, wherein the machine executable instructions further include instructions to:

transmit an indication that the short packet transmission technique is applied to the application data.

37. The first network device of claim 8, wherein the machine executable instructions further comprise instructions to:

determine to transmit the application data in a payload field of the short packet in response to a determination that the length of the application data exceeds the threshold length.

wherein the comparison of the length of the application data with the plurality of payload field lengths is in response to determining to transmit the application data in the payload field.

38. The first network device of claim 8, wherein the machine executable instructions further comprise instructions to:

determine to transmit the application data in the short packet based, at least in part, on at least one member of a group consisting of a communication capability of the first network device, a communication capability of the second network device, and an application that generated the application data.

39. The first network device of claim 8, wherein the machine executable instructions further comprise instructions to:

determine to transmit the application data in a payload field of the short packet when the length of the application data exceeds a first threshold length but does not exceed a second threshold length.

40. The first network device of claim 39, wherein, the first threshold length is a predetermined frame control field length, and the second threshold length is a predetermined payload field length.

41. The first network device of claim 8, wherein the machine executable instructions further comprise instructions to:

determine that the powerline communication network includes the legacy network device; and generate the short packet based, at least in part, on a time interval associated with the legacy network device.

42. The first network device of claim 41, wherein the time interval is a contention window inter-frame space (CIFS).

43. The first network device of claim 8, wherein the first network device and the second network device are included in the powerline communication network of a vehicle.

44. The first network device of claim 8, wherein the first network device is a vehicle and the second network device is an electric vehicle supply equipment.

\* \* \* \* \*